United States Patent
Matsuzaki et al.

(10) Patent No.: US 10,847,837 B2
(45) Date of Patent: Nov. 24, 2020

(54) BINDER FOR NONAQUEOUS ELECTROLYTE SECONDARY BATTERY ELECTRODE, MANUFACTURING METHOD THEREOF, AND USE THEREOF

(71) Applicant: TOAGOSEI CO., LTD., Tokyo (JP)

(72) Inventors: Hideo Matsuzaki, Nagoya (JP); Naohiko Saito, Nagoya (JP); Kinuko Fujikura, Nagoya (JP); Atsushi Nishiwaki, Nagoya (JP); Akitsugu Shibata, Nagoya (JP)

(73) Assignee: TOAGOSEI CO. LTD., Tokyo (JP)

( * ) Notice: Subject to any disclaimer, the term of this patent is extended or adjusted under 35 U.S.C. 154(b) by 40 days.

(21) Appl. No.: 16/072,763

(22) PCT Filed: Jan. 24, 2017

(86) PCT No.: PCT/JP2017/002278
§ 371 (c)(1),
(2) Date: Jul. 25, 2018

(87) PCT Pub. No.: WO2017/130940
PCT Pub. Date: Aug. 3, 2017

(65) Prior Publication Data
US 2019/0036164 A1   Jan. 31, 2019

(30) Foreign Application Priority Data

Jan. 29, 2016 (JP) ................. 2016-016464

(51) Int. Cl.
| | |
|---|---|
| *H01M 10/0565* | (2010.01) |
| *H01M 4/134* | (2010.01) |
| *H01M 4/131* | (2010.01) |
| *H01M 4/133* | (2010.01) |
| *C08F 220/06* | (2006.01) |
| *H01M 4/62* | (2006.01) |
| *H01M 10/052* | (2010.01) |
| *H01M 10/058* | (2010.01) |
| *H01M 10/0525* | (2010.01) |

(52) U.S. Cl.
CPC ....... *H01M 10/0565* (2013.01); *C08F 220/06* (2013.01); *H01M 4/131* (2013.01); *H01M 4/133* (2013.01); *H01M 4/134* (2013.01); *H01M 4/622* (2013.01); *H01M 10/052* (2013.01); *H01M 10/058* (2013.01); *H01M 4/623* (2013.01); *H01M 10/0525* (2013.01)

(58) Field of Classification Search
CPC ............................................... H01M 4/62–622
See application file for complete search history.

(56) References Cited

U.S. PATENT DOCUMENTS

| | | | |
|---|---|---|---|
| 2002/0068783 A1 | 6/2002 | Maeda et al. | |
| 2014/0287308 A1 | 9/2014 | Okada et al. | |
| 2015/0287993 A1 | 10/2015 | Komaba et al. | |
| 2017/0040612 A1 * | 2/2017 | Komaba | H01M 10/0525 |
| 2017/0244105 A1 | 8/2017 | Okada et al. | |
| 2017/0352886 A1 | 12/2017 | Matsuzaki et al. | |
| 2018/0138508 A1 | 5/2018 | Komaba et al. | |

FOREIGN PATENT DOCUMENTS

| | | | |
|---|---|---|---|
| CN | 108140839 A | 6/2018 | |
| JP | 2000-294247 A | 10/2000 | |
| JP | 2013-168323 A | 8/2013 | |
| JP | 2015-018776 A | 1/2015 | |
| WO | 2007/144118 A1 | 12/2007 | |
| WO | 2013/081152 A1 | 6/2013 | |
| WO | 2013/154165 A1 | 10/2013 | |
| WO | 2014/065407 A1 | 5/2014 | |
| WO | 2015/108109 A1 | 7/2015 | |
| WO | 2015/163302 A1 | 10/2015 | |
| WO | WO-2015163302 A1 * | 10/2015 | ............ H01M 4/587 |

OTHER PUBLICATIONS

Mar. 21, 2017 International Search Report issued in International Patent Application No. PCT/JP2017/002278.
Mar. 21, 2017 Written Opinion issued in International Patent Application No. PCT/JP2017/002278.
Jul. 30, 2019 Office Action issued in Japanese Patent Application No. 2017-564257.

* cited by examiner

*Primary Examiner* — Karie O'Neill Apicella
(74) *Attorney, Agent, or Firm* — Oliff PLC

(57) ABSTRACT

A binder for a nonaqueous electrolyte secondary battery electrode, containing a crosslinked polymer or salt thereof having a carboxyl group and a use thereof, and a method of manufacturing the polymer or salt. The polymer has a structural unit derived from an ethylenically unsaturated carboxylic acid monomer in an amount of 50 to 99 mass % of total structural units and a structural unit derived from a nonionic ethylenically unsaturated monomer in an amount of 1 to 50 mass % of the total structural units, the monomer is a compound having a substituent with a carbon atom number of 6 or more, and a particle diameter of the crosslinked polymer is 0.1 to 7.0 μm in a volume-based median diameter when the crosslinked polymer is neutralized to a neutralization degree of 80 to 100 mol %, subjected to water swelling in water, and then dispersed in a 1 mass % NaCl aqueous solution.

11 Claims, No Drawings

BINDER FOR NONAQUEOUS ELECTROLYTE SECONDARY BATTERY ELECTRODE, MANUFACTURING METHOD THEREOF, AND USE THEREOF

TECHNICAL HELD

The teachings herein relate to a binder for nonaqueous electrolyte secondary battery electrode, which is usable for a lithium ion battery and use thereof, and a manufacturing method of crosslinked polymer or salt thereof having a carboxyl group that is used in the binder.

BACKGROUND ART

Lithium-ion secondary batteries are well known as examples of nonaqueous electrolyte secondary batteries. Lithium-ion secondary batteries are popular in mobile devices such as smart phones, tablets, and notebook computers due to their superior energy density, output density, charge-discharge cycle characteristics and the like in comparison with other secondary batteries such as lead batteries, and they have contributed to reducing the size and weight and increasing the performance of such devices. In terms of input-output characteristics, charging times and the like, however, they have not yet reached the level of performance required of secondary batteries for use in electrical vehicles and hybrid vehicles (vehicle-mounted secondary batteries). Therefore, research is being conducted to improve the charge-discharge characteristics at high current densities (high-rate characteristics) with the aim of increasing the output and reducing the charging times of nonaqueous electrolyte secondary batteries. Further, high durability is required for vehicle-mounted applications, it is demanded that the charge-discharge characteristics are compatible with the cycle characteristics. Especially, the cycle characteristics tend to deteriorate in designs that use of active materials having a high capacity or high voltage and/or thickens an electrode mixture layer for increasing energy density, which directly affects mileages per one charging operation, and a technique capable of maintaining superior cycle characteristics is being demanded.

Further, superior durability (cycle characteristics) is required for a nonaqueous electrolyte secondary battery.

A nonaqueous electrolyte secondary battery is composed of a pair of electrodes disposed with a separator in between and a nonaqueous electrolyte solution. Each electrode is formed of a collector and a mixture layer formed on a surface of the collector, and the mixture layer is formed by coating and drying an electrode mixture layer composition (slurry) containing an active material and a binder and the like on the collector.

Here, when charging or discharging at a high rate is performed, swelling and contraction of the active material occurs by rapid absorption and discharge of lithium ions. In order for the battery to exhibit superior durability even in such a case, a binder having high binding ability which can prevent deteriorations caused by the charge-discharge cycle, such as a breakdown of the electrode mixture layer and exfoliation of the electrode mixture layer from the collector is being demanded.

Meanwhile, in recent years, aqueous electrode mixture layer compositions have also been in increased demand for reasons such as environmental protection and cost reduction. In the context of lithium-ion secondary batteries, aqueous binders using styrene butadiene rubber (SBR) and carboxymethyl cellulose (CMC) are used as the binders in electrode mixture layer compositions for negative electrodes that use carbon materials such as graphite as the active material. However, further improvements are needed to accommodate the advanced high-rate characteristics and cycle characteristics required for vehicle-mounted applications. Further, solvent-based binders of polyvinylidene fluoride (PVDF) and the like using organic solvents such as N-methyl-2-pyrrolidone (NMP) are preferred for the positive electrodes of lithium-ion secondary batteries, and no aqueous binder has been proposed that fulfills the requirements discussed above.

Active materials such as graphite and hard carbon (HC) and other carbon-based materials including conductive assistants such as Ketjen black (KC) and acetylene black (AB) are often used as components of lithium-ion secondary batteries. In general, these carbon-based materials have poor wettability by aqueous media, so to obtain a uniform electrode mixture layer composition with excellent dispersion stability, an aqueous binder having an excellent dispersion stabilizing effect on these carbon-based materials is desired. Mixture layer compositions with superior dispersion stability can form electrode mixture layers having excellent flatness upon their application on the collectors (metal foils) without occurrences of defects such as bubbles and streaks. Further, the active materials and conductive assistants are dispersed evenly, as a result of which electrode mixture layers with superior conductivity can be obtained.

Further, processes such as winding, rewinding, cutting and rolling are performed in an electrode manufacturing process. If the electrode mixture layers fall off from the collectors in these processes, productivity (yield) significantly drops by contamination of production lines and occurrence of defective products. Thus, a binder having high binding ability and with which mixture layer failures do not occur is being demanded.

Under such a situation, several aqueous binders applicable to lithium ion secondary battery electrodes are being proposed.

Patent Literature 1 describes an acrylic acid polymer crosslinked with a polyalkenyl ether as a binder for forming a negative electrode coating of a lithium-ion secondary battery. Patent Literature 2 describes obtaining an excellent capacity retention rate without breakdown of an electrode structure by using a polymer in which polyacrylic acid is crosslinked with a specific crosslinking agent as a binder, even in a case of using an active material containing silicon, of which volume varies prominently upon discharging and charging. Patent Literature 3 describes an aqueous secondary battery electrode binder including a structural unit derived from an ethylenically unsaturated carboxylic acid salt monomers and a structural unit derived from an ethylenicaily unsaturated carboxylic acid ester monomers, and containing a water-soluble polymer with a specific aqueous solution viscosity.

CITATION LIST

Patent Literatures

Patent Literature 1: JP 2000-294247 A
Patent Literature 2: WO 2014/065407 A1
Patent Literature 3: JP 2015-18776 A

SUMMARY

Technical Problem

Both Patent literature 1 and Patent Literature 2 describe using a crosslinked polyacrylic acid as a binder, but improvements in flex resistance and the like of an electrode fabricated thereby are needed. A binder described in Patent Literature 3 has improved elasticity, but is still not good with respect to dispersion stability and binding ability. Moreover, as a recent trend, use of active materials including silicon or thickening of an electrode mixture layer is sought to achieve larger battery capacity. Due to this, more sophisticated binding ability for the binder and improvements on the flex resistance of the electrode fabricated thereby are demanded.

The teachings herein have been made in view of the above circumstance, and aims to provide a binder for nonaqueous electrolyte secondary battery electrode by which a mixture layer slurry with good dispersion stability and an electrode having excellent binding ability and flex resistance can be obtained, and a method of manufacturing crosslinked polymer or salt thereof used in this binder. Further, the teachings herein further aim to provide a nonaqueous electrolyte secondary battery electrode mixture layer composition obtained and a nonaqueous electrolyte secondary battery electrode by using the above binder.

Solution to Technical Problem

The inventors discovered as a result of earnest researches aimed at solving these problems that an electrode obtained using a binder that contains a crosslinked polymer or salt thereof having a carboxyl group and a substituent with a carbon atom number of 6 or more, and has a sufficiently small particle diameter when neutralized and then dispersed in saline solution exhibits excellent binding ability and flex resistance. It has been also discovered that a mixture layer slurry containing such a binder exhibits good dispersion stability. The present teachings have been perfected based on these findings.

The present teachings are as follows.

(1) A binder for a nonaqueous electrolyte secondary battery electrode, containing a crosslinked polymer or salt thereof having a carboxyl group, wherein the crosslinked polymer comprises a structural unit derived from an ethylenically unsaturated carboxylic acid monomer in an amount of 50 to 99 mass % of total structural units and a structural unit derived from a nonionic ethylenically unsaturated monomer in an amount of 1 to 40 mass % of the total structural units, the nonionic ethylenically unsaturated monomer is a compound having a substituent with a carbon atom number of 6 or more, and
a particle diameter of the crosslinked polymer is 0.1 to 7.0 μm in a volume-based median diameter when the crosslinked polymer is neutralized to a neutralization degree of 80 to 100 mol %, subjected to water swelling in water, and then dispersed in a 1 mass % NaCl aqueous solution.

(2) The binder according to (1) above, wherein the crosslinked polymer is crosslinked with a crosslinking monomer, and an amount of the crosslinking monomer used is 0.02 to 0.7 mol % of a total amount of the non-crosslinking monomers.

(3) The binder according to (1) or (2) above, wherein the substituent with the carbon atom number of 6 or more in the nonionic ethylenically unsaturated monomer has an aromatic ring.

(4) A method for manufacturing a crosslinked polymer or a salt thereof having a carboxyl group for use in a binder for a nonaqueous electrolyte secondary battery electrode, wherein a particle diameter of the crosslinked polymer is 0.1 to 7.0 μm in a volume-based median diameter when the crosslinked polymer is neutralized to a neutralization degree of 80 to 100 mol %, subjected to water swelling in water, and then dispersed in a 1 mass % NaCl aqueous solution, the method comprising polymerizing a monomer composition by precipitating polymerization, the monomer composition having ethylenically unsaturated carboxylic acid monomers in an amount of 50 to 99 mass % and nonionic ethylenically unsaturated monomers having a substituent with a carbon atom number of 6 or more in an amount of 1 to 50 mass %.

(5) The method for manufacturing the crosslinked polymer or the salt thereof according to (4) above, wherein a polymerization medium containing acetonitrile is used in the polymerizing.

(6) The method for manufacturing the crosslinked polymer or the salt thereof according to (4) or (5) above, further comprising:

drying which takes place after the polymerizing; and
neutralizing which takes place after the polymerizing and before the drying, and in which the polymer is neutralized by adding an alkali compound to a polymer dispersion obtained in the polymerizing.

(7) A nonaqueous electrolyte secondary battery electrode mixture layer composition comprising a binder according to one of (1) to (3) above, an active material, and water.

(8) The nonaqueous electrolyte secondary battery electrode mixture layer composition according to (7) above, further comprising a styrene/butadiene latex as a binder.

(9) The nonaqueous electrolyte secondary battery electrode mixture layer composition according to (7) or (8) above, farther comprising a carbon material or a silicon material as a negative electrode active material.

(10) The nonaqueous electrolyte secondary battery electrode mixture layer composition according to (7) or (8) above, further comprising a lithium-containing metal oxide as a positive electrode active material.

(11) A nonaqueous electrolyte secondary battery electrode comprising a mixture layer constituted on a collector surface, the mixture layer being constituted of a nonaqueous electrolyte secondary battery electrode mixture layer composition according to one of (7) to (10) above.

Advantageous Effects

The binder for nonaqueous electrolyte secondary battery electrode disclosed herein exhibits excellent binding ability and also has an excellent binder uniformity in its mixture layer, so an electrode having good flex resistance can be obtained. Due to this, the electrode that is resistant to detachment of the mixture layer due to high-rate charging and discharging cycles can be obtained. Further, the nonaqueous electrolyte secondary battery electrode mixture layer composition disclosed herein has superior dispersion stability of the active material and the like, so it can yield a nonaqueous electrolyte secondary battery electrode having a uniform mixture layer and good electrode characteristics.

Hereinbelow, the teachings herein will be described in detail. In this Description, "(meth)acrylic" means acrylic and/or methacrylic, and "(meth)acrylate" means acrylate and/or methacrylate. Further, a "(meth)acryloyl group" means an acryloyl group and/or a methacryloyl group.

A binder for a nonaqueous electrolyte secondary battery electrode of the present teachings contains a crosslinked polymer or salt thereof, and can be mixed with an active material and water to obtain an electrode mixture layer composition. This composition may be a slurry that can be coated on a collector, or it may be prepared as a wet powder and pressed onto a collector surface. The nonaqueous electrolyte secondary battery electrode of the present teachings is obtained by forming a mixture layer constituted of this composition on the surface the collector such as a copper foil or an aluminum foil.

Each of the binder for the nonaqueous electrolyte secondary battery electrode, the method for manufacturing the crosslinked acrylic polymer for use in the binder, and the electrode mixture layer composition for a nonaqueous electrolyte secondary battery and the nonaqueous electrolyte secondary battery electrode obtained by using the binder will be described in detail.

(Binder)

The binder of the present teachings contains a crosslinked polymer or a salt thereof having a carboxyl group. This crosslinked polymer contains a structural unit derived from an ethylenically unsaturated carboxylic acid monomer (hereinbelow may be referred to as "component (a)") in an amount of 50 to 99 mass %, preferably 55 to 99 mass %, more preferably 60 to 95 mass %, and yet more preferably 65 to 90 mass % of total structural units. When the crosslinked polymer has a carboxyl group, adhesion to a collector is improved, and the polymer exhibits excellent lithium ion dissolution effect and excellent ion conductivity, so a resulting electrode having low resistance and excellent high-rate characteristics can be obtained. This also confers water swellability, which can increase dispersion stability of an active material and the like in a mixture layer composition. If the amount of the ethylenically unsaturated carboxylic acid monomer is less than 50 mass % as a percentage of the total structural units, there is a risk that dispersion stability, binding ability and battery durability may be inadequate.

The aforementioned structural unit derived from the ethylenically unsaturated carboxylic acid monomer can be introduced by polymerizing a monomer containing the ethylenically unsaturated carboxylic acid monomer, for example. Aside from this method, it may be obtained by (co)polymerizing a (meth acrylic ester monomer and thereafter hydrolyzing the same. Alternatively, a method that polymerizes (meth)acrylamide and (meth)acrylonitrile and thereafter treating the same with strong alkali, or that reacts acid anhydride with a polymer having a hydroxyl group may be employed.

Examples of the ethylenically unsaturated carboxylic acid monomer include (meth)acrylic acid; (meth)acrylamide alkyl carboxylic acids such as (meth)acrylamide hexanoic acid and (meth)acrylamide dodecanoic acid; ethylenically unsaturated monomers having carboxyl groups, such as succinic acid monohydroxy ethyl (meth)acrylate, ω-carboxy-caprolactone mono(meth)acrylate and ß-carboxyethyl (meth)acrylate, and (partial) alkali neutralization products thereof, and one of these may be used alone, or a combination of two or more may be used. Among these, a compound having are acryloyl group is preferred because its polymerization rate is faster, resulting in a polymer with a long primary chain length and a binder with good binding ability, and acrylic acid is especially desirable. A polymer with a high carboxyl group content can be obtained when acrylic acid is used as the ethylenically unsaturated carboxylic acid monomer.

Types of salts include alkali metal salts such as lithium, sodium and potassium salts; alkali earth metal salts such as calcium salts and barium salts; other metal salts such as magnesium salts and aluminum salts; ammonium salts, organic amine salts and the like. Among these, alkali metal salts and magnesium salts are preferable because they are less likely to adversely affect the battery characteristics, and alkali metal salts are more preferable. Lithium salts are especially preferable as alkali metal salts.

Aside from the component (a), the crosslinked polymer of the present teachings contains a structural unit derived from a nonionic ethylenically unsaturated monomer having a substituent with a carbon atom number of 6 or more (hereinbelow may be referred to as "component (b)"). A proportion of the component (b) is in an amount of 1 to 50 mass %, preferably 1 to 45 mass %, more preferably S to 40 mass %, yet more preferably 10 to 35 mass %, and further preferably 10 to 30 mass % of total structural units.

The component (b) can be introduced by polymerizing a monomer containing the nonionic ethylenically unsaturated monomer having the substituent with the carbon atom number of 6 or more, for example. The "substituent having the carbon atom number of 6 or more" means that the carbon atom number of a portion corresponding to a side chain (pendant portion) of a polymer to be obtained in a case of using the nonionic ethylenically unsaturated monomer in the polymerization is 6 or more. Thus, carbonyl carbon in alkyl(meth)acrylate and (meth)acrylamide derivatives is included therein. For example, in a case of hexyl acrylate, the carbon atom number of the substituent thereof becomes "7", constituted of a carbon atom number "6" of an alkyl group (hexyl group) and carbon atom number "1" of ester group portion.

When the polymer contains the component (b) in the amount of equal to or more than 1 mass %, it is easy to obtain an electrode with excellent flex resistance because the resulting mixture layer is more flexible. Further, the binding ability to carbon active materials such as graphite is thereby improved. On the other hand, if the component (b) is equal to or less than 50 mass %, the component (a) can be secured at its necessary amount, and it is also preferable from the viewpoint of manufacturing stability.

As the component (b), for example, a compound having a substituent with a carbon atom number of 6 or more, such as (meth)acrylic ester, (meth)acrylamide derivative, styrene and derivative thereof, vinyl ether, and vinyl ester may be exemplified, among these, (meth)acrylic ester, (meth)acrylamide derivative, and styrene and derivative thereof are preferable due to their polymerization performance and availability.

There is no specific limitation to the above (meth)acrylic ester so long as it is a compound having a substituent with a carbon atom number of 6 or more. For example, alkyl ester (meth)acrylate compounds such as amyl (meth)acrylate hexyl (meth)acrylate, 2-ethythexyl (meth)acrylate, octyl (meth)acrylate, isooctyl (meth)acrylate, nonyl (meth)acrylate, isononyl (meth)acrylate, lauryl (meth)acrylate, stearyl (meth)acrylate, and behenyl (meth)acrylate; cycloalkyl ester (meth)acrylate compounds such as cyclopentyl (meth)acrylate, cyclohexyl (meth)acrylate methyl cyclohexyl (meth)acrylate, isobornyl (meth)acrylate, dicyclopentanyl (meth)acrylate, and dicyclopentanyloxyethyl (meth)acrylate; and aromatic alkyl ester (meth)acrylate compounds such as benzyl (meth)acrylate, phenylethyl (meth)acrylate, phenoxy ethyl (meth)acrylate, 2-hydroxy-3-phenoxypropyl (meth)acrylate, o-phenyl phenoxy ethyl (meth)acrylate, p-cumyl phenoxy ethyl (meth)acrylate, nonyl phenoxy ethyl (meth)acrylate, phenoxy polyethylene glycol (meth)acrylate, and o-phenyl phenoxy polyethylene glycol (meth)acrylate may be exemplified, one of which may be used individually, or two or more of which may be used in combination.

There is no specific limitation to the above (meth)acrylamide derivative so long as it is a compound having a substituent with a carbon atom number of 6 or more. For example, N,N-diisopropyl (meth)acrylamide, N,N-dibutyl (meth)acrylamide, N-hexyl (meth)acrylamide, N-2-ethylhexylhexyl (meth)acrylamide, N-n-butoxy methyl (meth) acrylamide, and N-isobutoxymethyl (meth)acrylamide may be exemplified, one of which may be used individually, or two or more of which may be used in combination.

As the styrene and the derivative thereof, styrene, α-methyl styrene, vinyl toluene and the like may be exemplified, one of which may be used individually, or two or more of which may be used in combination.

As above, the carbon atom number of the substituent in the component (b) is 6 or more, preferably 8 or more, more preferably 10 or more, and yet more preferably 12 or more. Further, in a case where this substituent has an aromatic ring, such is preferable in that its mutual effect with especially the carbon active material is high, and binding ability thereof becomes excellent. On the other hand, from the viewpoint of polymerization performance and availability, an upper limit of the carbon atom number as above is 30.

The substituent in the component (b) is highly hydrophobic, and it is expected to exhibit high binding ability due to its strengthened affinity with the carbon active material such as graphite and a conductive assistant to be described later. Further, this effect tends to achieve better results in the case where the substituent in the component (b) has the aromatic ring.

Among the aforementioned types of the component (b), a compound having the acryloyl group is preferable in that it yields a polymer with long primary chain length due to its fast polymerization speed, and this improves the binding ability of the binder. Further, a compound having a homopolymer glass transition temperature (Tg) of 10° C. or lower is preferable in that the ilex resistance of the obtained electrode can be improved.

The crosslinked polymer of the teachings herein may contain a structural unit derived from an ethylenically unsaturated monomer (hereinbelow may be referred to as "component (c)") other than the aforementioned components (a) and (b). A content ratio of the component (c) is preferably 0 to 40 mass % to the total structural units of the crosslinked polymer, more preferably to 30 mass %, and yet more preferably 5 to 20 mass %. The component (c) can be introduced to the crosslinked polymer, for example, by using the ethylenically unsaturated monomer which is other than the aforementioned components (a) and (b), and which can be copolymerized with these components (a) and (b).

A nonionic monomer other than the component (b) is preferable as the component (c), which may be (meth)acrylic ester, (meth)acrylamide derivative, and the like, and a compound having a substituent having the carbon atom number of 5 or less can be exemplified.

As such (meth)acrylic ester, for example, alkyl ester (meth)acrylate compounds such as methyl (meth)acrylate, ethyl (meth)acrylate, propyl (meth)acrylate, isopropyl (meth)acrylate, butyl (meth)acrylate, isobutyl (meth)acrylate, and tert-butyl (meth)acrylate; alkoxy alkyl ester (meth) acrylate compounds such as 2-methoxyethyl (meth)acrylate and ethoxy ethyl (meth)acrylate; and hydroxyalkyl ester (meth)acrylate compounds such as hydroxyethyl (meth) acrylate, hydroxy-propyl (meth)acrylate, and hydroxy butyl (meth)acrylate may be exemplified, one of which may be used individually, or two or more of which may be used in combination.

Among the above, a compound having an ether bond, such as alkoxy alkyl (meth)acrylates such as 2-methoxyethyl (meth)acrylate and ethoxy ethyl (meth)acrylate is preferable, and 2-methoxyethyl (meth)acrylate is more preferable in that it has a high lithium ion conductivity and improves the high-rate characteristics.

As the (meth)acrylamide derivative, for example, N-alkyl (meth)acrylamide compounds such as isopropyl (meth)acrylamide and t-butyl (meth)acrylamide; and N,N-diallyl (meth)acrylamide compounds such as dimethyl (meth)acrylamide and diethyl (meth)acrylamide may be exemplified, one of which may be used individually, or two or more of which may be used in combination. Using the aforementioned (meth)acrylamide derivative as the component (c) is preferable since such use exhibits a tendency to improve the binding ability of the binder.

Further, vinyl compounds having ionic functional groups other than the carboxyl group, such as an amino group-containing vinyl compound, a sulfonate group-containing vinyl compound, and a phosphate group-containing vinyl compound, may be used.

A cross linking method in the crosslinked polymer of the present teachings is not particularly limited, and for example, methods as below may be exemplified.
1) Copolymerization of crosslinking monomers
2) Use of chain transfer of a polymer chain during radical polymerization
3) Synthesizing polymer having reactive functional groups, adding a crosslinking agent thereto as necessary, and then crosslinking the polymers.

Among the above, the method using the copolymerization of crosslinking monomers is preferable due to its simple operation and controllability of crosslinking degrees.

As the crosslinking monomers, polyfunctional polymerizable monomers having two or more polymerizable unsaturated groups, and monomers having a self crosslinkable functional group such as a hydrolyzable silyl group may be exemplified.

The polyfunctional polymerizable monomers are compounds having two or more polymerizable functional groups such as (meth)acryloyl group or alkenyl group in the molecule, and polyfunctional (meth)acrylate compounds, polyfunctional alkenyl compounds, and compounds having both (meth)acryloyl and alkenyl groups and the like may be exemplified. One of these compounds may be used individually, or a combination of two or more may be used. Among them, a polyfunctional alkenyl compound is preferable for ease of obtaining a uniform crosslinked structure, and a polyfunctional allyl ether compound having a plurality of allyl ether groups in the molecule is especially preferable.

Examples of polyfunctional (meth)acrylate compounds include di(meth)acrylates of dihydric alcohols, such as ethylene glycol di(meth)acrylate, propylene glycol di(meth)acrylate, 1,6-hexanediol di(meth)acrylate, polyethylene glycol di(meth)acrylate and polypropylene glycol di(meth)acrylate; poly(meth)acrylate such as tetra(meth)acrylate or tri(meth)acrylates of trihydric and higher polyhydric alcohols, such as trimethylolpropane tri(meth)acrylate, trimethylolpropane ethylene oxide modified tri(meth)acrylate, glycerin tri(meth)acrylate, pentaerythritol tri(meth)acrylate and pentaerythritol tetra(meth)acrylate; and bisamides such as methylene bisacrylamide and hydroxy ethylene bisacrylamide and the like.

Examples of polyfunctional alkenyl compounds include polyfunctional allyl ether compounds such as trimethylolpropane diallyl ether, trimethylolpropane triallyl ether, pentaerythritol diallyl ether, pentaerythritol triallyl ether, tetraallyl oxyethane and polyallyl saccharose; polyfunctional allyl compounds such as diallyl phthalate; and polyfunctional vinyl compounds such as divinyl benzene and the like.

Examples of compounds having both (meth)acryloyl and alkenyl groups include allyl (meth)acrylate, isopropenyl (meth)acrylate, butenyl (meth)acrylate, pentenyl (meth)acrylate and 2-(2-vinyloxyethoxy)ethyl (meth)acrylate and the like.

Specific examples of the monomers having self crosslinkable functional groups include vinyl monomers containing hydrolyzable silyl groups, N-methylol (meth)acrylamide, N-methoxy alkyl (meth)acrylate and the like. One of these compounds may be used individually or two or more thereof may be used in combination.

The vinyl monomers containing hydrolyzable silyl groups are not particularly limited so long as they are vinyl monomers having at least one hydrolyzable silyl group. Examples include vinyl silanes such as vinyl trimethoxy silane, vinyl triethoxy silane, vinyl methyl dimethoxy silane and vinyl dimethyl methoxy silane; acrylic acid esters containing silyl groups, such as trimethoxy silyl propyl acrylate, triethoxy silyl propyl acrylate and methyl dimethoxy silyl propyl acrylate; methacrylic acid esters containing silyl groups, such as trimethoxy silyl propyl methacrylate, triethoxy silyl propyl methacrylate, methyl dimethoxy silyl propyl methacrylate and dimethyl methoxy silyl propyl methacrylate; vinyl ethers containing silyl groups, such as trimethoxy propyl vinyl ether; and vinyl esters containing silyl groups, such as vinyl trimethoxy silyl undecanoate and the like.

When the crosslinked polymer of the present teachings is crossliriked with a crosslinkable monomer, the amount of the crosslinkable monomer used is preferably 0.02 to 0.7 mol %, more preferably 0.03 to 0.4 mol % of the total amount of the monomers (non-crosslinkable monomers) other than the crosslinkable monomer. The amount of the crosslinkable monomer is preferably equal to or more than 0.02 mol % because this results in good binding ability and greater stability of the mixture layer slurry, if the amount is equal to or less than 0.7 mol %, the crosslinked polymer tends to be more stable.

To exhibit excellent binding ability with the binder containing the crosslinked polymer, the crosslinked polymer is preferably well dispersed in the mixture layer composition in a form of water-swollen particles of a suitable particle diameter. This is because when secondary aggregates of the crosslinkable polymer do not break up but persist as large-particle-size clumps, the dispersion stability of the slurry becomes insufficient, and the binder (crosslinked polymer) is nonuniformly present in the mixture layer, so that adequate binding ability may not be obtained and battery performance may be adversely affected. Even if the primary particles are dispersed without secondary aggregation, moreover, there is a similar risk that adequate binding ability may not be obtained if the particle size is too large.

When the crosslinked polymer or salt thereof of the present teachings having a neutralization degree of 80 to 100 mol % based on the carboxyl groups of the crosslinked polymer is subjected to water swelling in an aqueous medium and dispersed in a 1.0 mass % NaCl aqueous solution, the particle diameter thereof is preferably in a range of 0.1 to 7.0 µm in a volume-based median diameter. This particle diameter is more preferably in the range of 0.5 to 5.0 µm, still more preferably in the range of 1.0 to 4.0 µm, and yet more preferably in the range of 1.0 to 3.0 µm. If the particle diameter is in the range of 0.1 to 7.0 µm, because the crosslinked polymer or salt thereof is uniformly present at a suitable size in the mixture layer composition, the resulting mixture layer composition is highly stable and can exhibit excellent binding ability. Binding ability may be insufficient if the particle diameter exceeds 7.0 µm for the reasons discussed above, and manufacturing stability is a concern if the particle diameter is less than 0.1 µm.

If the crosslinked polymer is unneutralized or the neutralization degree is less than 80 mol %, it is neutralized to the neutralization degree of 80 to 100 mol % with an alkali metal hydroxide in an aqueous medium and subjected to thorough water swelling, after which the particle diameter is measured with the polymer similarly dispersed in the 1.0 mass % NaCl aqueous solution. In general, when a crosslinked polymer or salt thereof is in a form of a powder or solution (dispersion solution), primary particles are often present as associated or aggregated bulk particles. Because the crosslinked polymer or salt thereof of the present teachings has extremely good dispersibility, the bulk particles are broken up when it is neutralized to the neutralization degree of 80 to 100 mol % and subjected to water swelling, resulting in a stable dispersed state formed substantially of dispersed primary particles.

Thus, the crosslinked polymer or salt thereof of the present teachings has good dispersibility, and can be stably dispersed in the form of water-swollen particles of the suitable diameter in the mixture layer composition (aqueous medium). However, scattered light may not be obtained with the particles in the water-swollen state, making it impossible to measure the particle diameter directly in the aqueous medium. The particle diameter can be measured by adding the particles to the aforementioned NaCl aqueous solution and shielding charge of the polymer because this suppresses water swelling.

If the crosslinked polymer or salt thereof disperses stably in the medium in the form of primary particles of the suitable particle diameter, or if it disperses in the medium in the form of particles of the suitable particle diameter because any secondary aggregated particles are easily broken up, uniformity in the mixture layer is high and excellent binding ability and flex resistance can be obtained. The crosslinked polymer or salt thereof of the present teachings can be obtained, for example, by methods described below as methods for manufacturing the crosslinked polymer or salt thereof.

In general, toughness of the crosslinked polymer increases as the length of the polymer chain (primary chain length) increases, allowing for greater binding ability and increasing a viscosity of the aqueous dispersion solution. Moreover, a crosslinked polymer (salt) obtained by applying a relatively small amount of crosslinking to a polymer with a long primary chain length exists in water in a form of a water-swollen microgel. In the electrode mixture layer composition of the present teachings, thickening effects and dispersion stabilizing effects are obtained through interaction of the microgel. The interactions of the microgel differ depending on the degree of water swelling of the microgel and strength of the microgel, and these are affected by the degree of crosslinking of the crosslinked polymer. If the degree of crosslinking is too low, the microgel may not be strong enough, and the dispersion stabilizing effect and binding ability may be insufficient as a result, if the degree of crosslinking is too high, on the other hand, the dispersion stabilizing effect and binding ability may be insufficient because the microgel does not swell sufficiently. That is, the crosslinked polymer is preferably a slightly-crosslinked polymer obtained by subjecting a polymer with a sufficiently long primary chain length to a suitable degree of crosslinking.

In the mixture layer composition, the crosslinked polymer or salt thereof of the present teachings is preferably used in a form of a salt in which acid groups including carboxyl groups derived from the ethylenically unsaturated carboxylic acid monomer have been neutralized so that the neutralization degree is 20 to 100 mol %. The neutralization degree is more preferably 50 to 100 mol %, and still more preferably 60 to 95 mol %. The neutralization degree equal to or more than 20 mol % is preferable for obtaining good water swellability and the dispersion stabilization effect.

The viscosity of the crosslinked polymer or salt thereof of the present teachings is preferably equal to or less than 500 mPa·s in a 1 mass % aqueous solution and equal to or more than 5,000 mPa·s in a 3 mass % aqueous solution. The viscosity of the 1 mass % aqueous solution is more preferably equal to or less than 300 mPa·s, and still more preferably equal to or less than 100 mPa·s. The viscosity of the 3 mass % aqueous solution is more preferably equal to or more than 10,000 mPa's, and yet more preferably equal to or more than 30,000 mPa·s.

If the viscosity of the 1 mass % aqueous solution is equal to or less than 500 mPa·s, good coating properties are obtained because the viscosity of the mixture layer composition (described below) is sufficiently low. From a standpoint of the binding ability, the viscosity of the 1 mass % aqueous solution is preferably equal to or more than 1 mPa·s.

If the viscosity of the 3 mass % aqueous solution is equal to or more than 5,000 mPa·s, stability of the mixture layer composition is ensured, and good binding ability is obtained. From the standpoint of the coating properties, the viscosity of the 3 mass % aqueous solution is preferably equal to or less than 1,000,000 mPa·s.

In water, the crosslinked polymer or salt thereof of the present teachings absorbs water and becomes swollen. Therefore, the viscosity of the aqueous solution rises rapidly as the concentration of the aqueous solution rises and the crosslinked polymer becomes sufficiently packed.

In general, when a crosslinked polymer has a suitable degree of crosslinking, the greater the amount of hydrophilic groups in the crosslinked polymer, the more easily the crosslinked polymer is swollen as it absorbs water. Further, in terms of the degree of crosslinking, the lower the degree of crosslinking, the more easily the crosslinked polymer swells. It should be noted that even if a number of crosslinking points is the same, swelling of the crosslinked polymer is more difficult as the molecular weight (primary chain length) is greater because more of crosslinking points contribute to formation of three-dimensional networks. Thus, viscosities of the 1 mass % aqueous solution and 3 mass % aqueous solution can be regulated by adjusting an amount of hydrophilic groups in the crosslinked polymer, a number of crosslinking points, the primary chain length and the like. In this occasion, the number of crosslinking points can be adjusted by, for example, changing an amount of the crosslinking monomer, a chain transfer reaction to the polymer chain and post-crosslinking reactions and the like. Further, the primary chain length of the polymer can be adjusted by setting conditions that affect an amount of generated radicals, such as a type of an initiator and polymerization temperature, and by selecting the polymerization solvent and the like with consideration to the chain transfer or the like.

Because the aqueous solution viscosity strongly affects the viscosity of the mixture layer composition, the mixture layer composition with excellent coating properties even at a high concentration can be obtained by using the crosslinked polymer (salt) having the viscosity characteristics described above as the binder. Moreover, when the degree of crosslinking, molecular weight and the like of the crosslinked polymer or salt thereof have been adjusted to satisfy the above-described viscosity characteristics, greater peeling strength of the mixture layer can be obtained because the crosslinked polymer or salt thereof provides excellent binding ability as the binder.

(Method for Manufacturing Crosslinked Polymer or Salt Thereof)

A known polymerization method such as solution polymerization, precipitating polymerization, suspension polymerization or inverse-phase emulsification polymerization may be used for the crosslinked polymer of the present teachings, but the precipitating polymerization and suspension polymerization (inverse-phase suspension polymerization) are preferable for reasons of productivity. The precipitating polymerization is more preferable for obtaining good performance in terms of the binding ability and the like.

The precipitating polymerization is a method of manufacturing a polymer by performing a polymerization reaction in a solvent that dissolves the starting material (unsaturated monomer) but effectively does not dissolve the resulting polymer. As the polymerization progresses, the polymer particles grow larger by aggregation and polymer growth, and a dispersed solution of secondary polymer particles is obtained, in which primary particles of tens of nanometers to hundreds of nanometers are aggregated to the secondary polymer particles of micrometers to tens of micrometers in size. A dispersion stabilizer may be used to control the particle size of the polymers.

Such secondary aggregation can also be suppressed by selecting the dispersion stabilizer, a polymerization solvent and the like. In general, the precipitating polymerization in which the secondary aggregation is suppressed is also referred to as dispersion polymerization.

In a case of the precipitating polymerization, the polymerization solvent may be selected from water and various organic solvents and the like depending on a type of the monomer used and the like. To obtain a polymer with a longer primary chain length, it is desirable to use a solvent with a small chain transfer constant.

Specific examples of the polymerization solvents include: water-soluble solvents such as methanol, t-butyl alcohol, acetone, acetonitrile and tetrahydrofuran; benzene; ethyl acetate; dichloroethane; n-hexane; cyclohexane; and n-heptane and the like, and one of these or a combination of two or more may be used. Mixed solvents of any of these with water may also be used. In the present teachings, a water-soluble solvent means one having a solubility of more than 10 g/100 ml in water at 20° C.

Of these solvents, acetonitrile is preferred, for example, because polymerization stability is good, with less production of coarse particles and less adhesion to a reaction vessel, because the precipitated polymer fine particles are less liable to secondary aggregation (or any secondary aggregates that occur are easily broken up in an aqueous medium), because the chain transfer constant is low, resulting in a polymer with a high degree of polymerization (long primary chain length), and because an operation is easier in a process neutralization described below.

To achieve a stable and rapid neutralization reaction during this process neutralization, moreover, it is desirable to add a small amount of a high polar solvent to the polymerization solvent. Desirable examples of this highly polar solvent are water and methanol. The amount of the highly polar solvent used is preferably 0.0 to 10.0 mass %, more preferably 0.1 to 5.0 mass %, and yet more preferably 0.1 to 1.0 mass % based on the total mass of the medium. If the ratio of the highly polar solvent is equal to or more than 0.05 mass %, the effect on the neutralization reaction is achieved, while if it is equal to or less than 10.0 mass %, there is no adverse effect on the polymerization reaction. Further, when polymerizing a highly hydrophilic ethylenically unsaturated carboxylic acid monomer such as acrylic acid, adding the highly polar solvent serves to increase the polymerization rate and make it easier to obtain a polymer with a long primary chain length. Of the highly polar solvents, water in particular is desirable because it has a strong enhancing effect on the polymerization rate.

The manufacturing method of the present teachings preferably includes a polymerization step in which a monomer composition having an ethylenically unsaturated carboxylic acid monomer in the amount of 50 to 99 mass % and a nonionic ethylenically unsaturated monomer having the substituent with the carbon atom number of 6 or more in the amount of 1 to 50 mass % is precipitation polymerized. The polymerization step introduces the structural unit (component (a)) derived from the ethylenically unsaturated carboxylic acid monomer in the amount of 50 to 99 mass % as well as the structural unit (component (b)) derived from the nonionic ethylenically unsaturated monomer having the substituent with the carbon atom number of 6 or more in the amount of 1 to 50 mass % to the crosslinked polymer. The amount of the ethylenically unsaturated carboxylic acid monomer used herein is preferably 55 to 99 mass %, more preferably 60 to 95 mass %, and yet more preferably 65 to 90 mass %. Further, the amount of the nonionic ethylenically unsaturated monomer having the substituent with the carbon atom number of 6 or more used herein is preferably 1 to 45 mass %, more preferably 5 to 40 mass %, and yet more preferably 10 to 35 mass %.

The ethylenically unsaturated carboxylic acid monomer may be in an unneutralized state, or in the form of a neutralized salt. It may also be in the form of a partially neutralized salt in which a part of the used ethylenically unsaturated carboxylic acid monomer has been neutralized. Since the polymerization rate is high, the neutralization degree of the ethylenically unsaturated carboxylic acid monomer is preferably not more than 10 mol %, more preferably not more than 5 mol %, and yet more preferably the monomer is not neutralized from the standpoint of obtaining a polymer with a high molecular weight and excellent binding ability.

In addition to the ethylenically unsaturated carboxylic acid monomer and the nonionic ethylenically unsaturated monomer having the substituent with the carbon atom number of 6 or more, another ethylenically unsaturated monomer that is copolymerizable with the ethylenically unsaturated carboxylic acid monomer and the nonionic ethylenically unsaturated monomer having the substituent with the carbon atom number of 6 or more may be included as a monomer component in the manufacturing method of the present teachings. This other ethylenically unsaturated monomer may be, for example, an ethylenically unsaturated monomer compound, such as ester (meth)acrylate, (meth) acrylamide derivative, having an anionic group other than the carboxyl group, such as a sulfonic acid group or phosphoric acid group, or a vinyl compound containing amino groups or the like. This other ethylenically unsaturated monomer may be contained in the amount of 0 to 40 mass %, 1 to 30 mass %, or 5 to 20 mass % of the total amount of the monomer components.

A known polymerization initiator such as an azo compound, organic peroxide or inorganic peroxide may be used as the polymerization initiator, but no limitation is made to these examples. The conditions of use may be adjusted to achieve the suitable amount of radical generation, using a known method such as thermal initiation, redox initiation using a reducing agent, UV initiation or the like. To obtain the crosslinked polymer with a long primary chain length, the conditions are preferably set so as to reduce the amount of radical generation within an allowable range of manufacturing time.

Examples of the azo compound include 2,2'-azobis(2,4-dimethylvaleronitrile), 2,2'-azobis(N-butyl-2-methylpropionamide), 2-(tert-butyazo)-2-cyanopropane, 2,2'-azobis(2,4,4-trimethylpentane) and 2,2'-azobis(2-methylpropane), and one of these or a combination of two or more may be used.

Examples of the organic peroxide include 2,2-bis(4,4-di-t-butylperoxycyclohexyl) propane (product name "Pertetra A" by NOF Corporation), 1,1-di(t-hexylperoxy) cyclohexane (product name "Perhexa HC" by NOF Corporation), 1,1-di(t-butylperoxy) cyclohexane (product name "Perhexa C" by NOF Corporation), n-butyl-4,4-di(t-butylperoxy) valerate (product name "Perhexa V" by NOF Corporation), 2,2-di(t-butylperoxy) butane (product name "Perhexa 22" by NOF Corporation), t-butylhydroperoxide (product name "Perbutyl H" by NOF Corporation), cumene hydroperoxide (product name "Percurnyl H" by NOF Corporation), 1,1,3,3-tetramethylbutyl hydroperoxide (product name "Perocta H" by NOF Corporation), t-butylcumyl peroxide (product name "Perbutyl C" by NOF Corporation), di-t-butyl peroxide (product name "Perbutyl D" by NOF Corporation), di-t-hexyl peroxide (product name "Perhexyl D" by NOF Corporation), di(3,5,5-trimethylhexanoyl) peroxide (product name "Peroyl 355" by NOF Corporation), dilauroyl peroxide (product name "Peroyl L" by NOF Corporation), bis(4-t-butylcyclohexyl) peroxydicarbonate (product name "Peroyl TCP" by NOF Corporation), di-2-ethylhexyl peroxydicarbonate (product name "Peroyl OPP" by NOF Corporation), di-sec-butyl peroxydicarbonate (product name "Peroyl SBP" by NOF Corporation), cumyl peroxyneodecanoate (product name "Percumyl ND" by NOF Corporation), 1,1,3,3-tetramethylbutyl peroxyneodecanoate (product name "Perocta ND" by NOF Corporation), t-hexyl peroxyneodecanoate (product name "Perhexyl ND" by NOF Corporation), t-butyl peroxyneodecanoate (product name "Perbutyl ND" by NOF Corporation), t-butyl peroxyneoheptanoate (product name "Perbutyl NHP" by NOF Corporation), t-hexyl peroxypivalate (product name "Perhexyl PV" by NOF Corporation), t-butyl peroxypivalate (product name "Perbutyl PV" by NOF Corporation), 2,5-dimethyl-2,5-di(2-ethylhexanoyl) hexane (product name "Perhexa 250" by NOF Corporation), 1,1,3,3-tetramethylbutylperoxy-2-ethylhexanoate (product name "Perocta O" by NOF Corporation), t-hexylperoxy-2-ethylhexanoate (product name "Perhexyl O" by NOF Corporation), t-butylperoxy-2-ethylhexanoate (product name "Perbutyl O" by NOF Corporation), t-butyl peroxylaurate (product name "Perbutyl L" by NOF Corporation), t-butyl peroxy-3,5,5-trimethylhexarioate (product name "Perbutyl 355" by NOF Corporation), t-hexylperoxyisopropyl monocarhonate (product name "Perhexyl I" by NOF Corporation), t-butylperoxyisopropyl rnonocarbonate (product name "Perbutyl I" by NOF Corporation), t-butyl-peroxy-2-ethyl hexyl monocarbonate (product name "Perbutyl E" by NOF Corporation), t-butyl peroxyacetate (product name "Perbutyl A" by NOF Corporation), t-hexyl perokybenzoate (product name "Perhexyl Z" by NOF Corporation) and t-butyl peroxybenzoate (product name "Perbutyl Z" by NOF Corporation) and the like. One of these or a combination of two or more may be used.

Examples of the inorganic peroxide include potassium persulfate, sodium persulfate and ammonium persulfate.

When using a redox initiator, sodium sulfite, sodium thiosulfate, sodium formaldehyde sulfoxylate, ascorbic acid, sulfite gas (SO2), ferrous sulfate or the like can be used as the reducing agent.

The polymerization initiator is preferably used in the amount of 0.001 to 2 mass parts, more preferably 0.005 to 1 mass parts, and yet more preferably 0.01 to 0.1 mass parts given 100 mass parts as the total amount of the monomer components used. If the amount of the polymerization initiator is equal to or more than 0.001 mass parts, a stable polymerization reaction can be achieved, and if it is equal to or less than 2 mass parts the polymer with a long primary chain length can be easily obtained.

Regarding the concentration of the monomer component during the polymerization, a higher concentration is preferable for obtaining the polymer with a longer primary chain length. If the concentration of the monomer component is too high, however, the aggregation of the polymer particles tends to progress, the polymerization heat is difficult to control, and a runaway polymerization reaction is possible. Consequently, the monomer concentration at the start of the polymerization is generally in the range of about 2 to 30 mass %, and preferably in the range of 5 to 30 mass %.

The polymerization temperature depends on the conditions such as the type and concentration of the monomer used, but is preferably 0° C. to 100° C. and more preferably 20"C to 80° C. The polymerization temperature may be constant, or may change during the course of the polymerization reaction. Further, the polymerization time is preferably 1 minute to 20 hours, and more preferably 1 hour to 10 hours.

The target crosslinked polymer may be obtained in a powder state by applying reduced pressure and/or heat treatment or the like in a drying step to remove the solvent from the crosslinked polymer dispersed solution obtained through the polymerization step. Following the polymerization step but before the drying step, a solid-liquid separation step such as centrifugation or filtration or a washing step using a mixture of water and methanol and the like may be included with the aim of removing unreacted monomers (and their salts).

When the washing step is included, even if the crosslinked polymer has undergone secondary aggregation the aggregates are easily broken up, and good performance is obtained in terms of the binding ability and battery characteristics because remaining unreacted monomers are further removed.

When the unneutralized monomer or partially neutralized salt is used as the ethylenically unsaturated carboxylic acid monomer in the manufacturing method of the present teachings, an alkali compound can be added to the polymer dispersion obtained from the polymerization step to neutralize the polymer (hereunder referred to as "process neutralization"), after which the solvent can be removed in the drying step. Alternatively, a powder of the crosslinked polymer can first be obtained in an unneutralized or partially neutralized salt state, after which the alkali compound can be added when preparing the electrode mixture layer slurry to neutralize the polymer thereunder referred to as "post-neutralization"). Of these, process neutralization is preferable because it tends to make the secondary aggregates easier to break up.

(Electrode Mixture Layer Composition for a Nonaqueous Electrolyte Secondary Battery)

The electrode mixture layer composition for a nonaqueous electrolyte secondary battery of the present teachings contains the binder containing the crosslinked polymer or salt thereof, together with the active material and water.

The amount of the crosslinked polymer or salt thereof used in the electrode mixture layer composition of the present teachings is 0.1 to 20 mass %, preferably 0.2 to 10 mass %, more preferably 0.3 to 8 mass %, and yet more preferably 0.5 to 5 mass % of the total amount of the active material. If the amount of the crosslinked polymer or salt thereof is less than 0.1 mass %, sufficient binding ability may not be obtained. Moreover, dispersion stability of the active material and the like may be inadequate, detracting from the uniformity of the formed mixture layer. It the amount of the crosslinked polymer or salt thereof exceeds 20 mass %, on the other hand, the electrode mixture layer composition may become highly viscous, and the coating performance on the collector may decrease. Consequently, spots and irregularities may occur in the resulting mixture layer, adversely affecting the electrode characteristics. Interface resistance may also increase, detracting from the high-rate characteristics.

If the amount of the crosslinked polymer and salt thereof is within the aforementioned range, a composition with excellent dispersion stability can be obtained, and it is also possible to obtain a mixture layer with extremely high adhesiveness to the collector, resulting in improved battery durability. Moreover, because the crosslinked polymer and salt thereof has sufficient ability to bind the active material even in a small quantity (such as 5 mass % or less), and because it has carboxy anions, it can yield an electrode with small interface resistance and excellent high-rate characteristics.

Of the active materials described above, lithium salts of transition metal oxides are principally used as positive electrode active materials, and for example laminar rock salt-type and spinel-type lithium-containing metal oxides may be used. Specific compounds that are laminar rock salt-type positive electrode active materials include lithium cobaltate, lithium nickelate, and NCM $\{Li(Ni_xCo_yMn_z), x+y+z=1\}$ and NCA $\{Li(Ni_{1-a-b}Co_aAl_b)\}$ and the like, which are referred to as ternary materials. Further, examples of spinel-type positive electrode active materials include lithium manganate and the like. Apart from the oxides, phosphate salts, silicate salts and sulfur and the like may also be used. Examples of phosphate salts include olivine-type lithium iron phosphate and the like. One of these may be used alone as a positive electrode active material or two or more may be combined and used as a mixture or composite.

When the positive electrode active material containing the laminar rock salt-type lithium-containing metal oxide is dispersed in water, the dispersed solution exhibits alkalinity because the lithium ions on the surface of the active material are exchanged for hydrogen ions in the water. There is thus the risk of corrosion of aluminum foil (Al) or the like, which is a common positive electrode collector material. In such cases, it is desirable to neutralize the alkali component elated from the active material by using an unneutralized or partially neutralized crosslinked polymer as the binder. Further, the amount of the unneutralized or partially neutralized crosslinked polymer used is preferably to be used such that the amount of unneutralized carboxyl groups in the crosslinked polymer is equal to or more than the amount of alkali eluted from the active material.

Because all the positive electrode active materials have low electrical conductivity, a conductive assistant is normally added and used. Examples of the conductive assistant include carbon materials such as carbon black, carbon nanotubes, carbon fiber, graphite fine powder, and carbon fiber. Of these, carbon black, carbon nanotubes and carbon fiber are preferable since it is easier to obtain excellent conductivity. Further, as the carbon black, Ketjen black and acetylene black are preferable. One of these conductive assistants may be used alone, or a combination of two or more may be used. The amount of the conductive assistants used is preferably 2 to 20 mass %, and more preferably 2 to 10 mass % of the total amount of the active material in order to achieve both conductivity and energy density.

Further, a positive active material having a surface coating by a conductive carbon material may be used.

On the other hand, examples of negative electrode active materials include carbon materials, lithium metal, lithium alloys, metal oxides and the like, and one of these or a combination of two or more may be used. Of these, an active material formed of a carbon material such as natural graphite, artificial graphite, hard carbon, and soft carbon (hereunder referred to as a "carbon-based active material") is preferred, and hard carbon or a graphite such as natural graphite or artificial graphite is more preferred. In the case of graphite, spheroidized graphite is desirable from the standpoint of battery performance, and the particle size thereof is preferably in the range of 1 to 20 μm, or more preferably 5 to 15 μm.

To increase the energy density, metals, metal oxides or the like capable of occluding lithium, such as silicon and tin, may also be used as the negative electrode active materials. Of these, silicon has a higher capacity than graphite, and an active material formed of a silicon material such as silicon, a silicon alloy or a silicon oxide such as silicon monoxide (SiO) (hereunder referred to as a "silicon-based active material") may be used. However, these silicon-based active materials have high capacities, whereas their volume change accompanying charging and discharging is large. Therefore, they are preferably used in combination with the aforementioned carbon-based active materials. In this case, a large compounded amount of the silicon active material can cause breakdown of the electrode material, greatly detracting the cycle characteristics (durability), From this perspective, when the silicon-based active material is included, the amount thereof is preferably equal to or less than 60 mass %, and more preferably equal to or less than 30 mass % of the amount of the carbon-based active material.

In the binder containing the crosslinked polymer of the present teachings, the crosslinked polymer includes both the structural unit (component (a)) derived from the ethylenically unsaturated carboxylic acid monomer and the structural unit (component (b)) derived from the nonionic ethylenically unsaturated monomer having the substituent with the carbon atom number of 6 or more. Here, the component (a) has high affinity with the silicon-based active material and exhibits excellent binding ability therewith. Further, as aforementioned, the component (b) achieves superior effect in improving the binding ability with the carbon-based active material. Thus, the binder exhibits superior binding ability even in a case of using a high-capacity active material in which both the carbon-based active material and the silicon-based active material are used, and as such, it is expected to be effective regarding durability improvement of the resulting electrode.

Because the carbon-based active material inherently has good electrical conductivity, it may not be necessary to add a conductive assistant. When the conductive assistant is added to further reduce resistance or the like, the amount thereof is preferably not more than 10 mass %, and more preferably equal to or less than 5 mass % of the total amount of the active material from the standpoint of energy density.

When the electrode mixture layer composition for the nonaqueous electrolyte secondary battery is in a slurry form, the amount of the active material used is in the range of preferably 10 to 75 mass %, and more preferably 30 to 65 mass % of the total amount of the composition. The amount of the active material equal to or more than 10 mass % is advantageous for suppressing migration of the binder and the like, and also because of drying costs of the medium. If the amount is not more than 75 mass %, on the other hand, it is possible to ensure the flowability and coating performance of the composition, and to form a uniform mixture layer.

Further, in a case where the electrode mixture layer composition is prepared in a wet powder state, the amount of the active material used is in the range of preferably 60 to 97 mass %, and more preferably 70 to 90 mass % of the total amount of the composition.

Further, from the standpoint of energy density, non-volatile components other than the active material, such as the binder and conductive assistant, are preferably used in the smallest amounts possible within which necessary binding ability and conductivity are ensured.

The electrode mixture layer composition for the nonaqueous electrolyte secondary battery of the present teaching uses water as the medium. To adjust the properties such as drying properties of the composition, it is also possible to use a mixed solvent of water with a water-soluble organic solvent, which may be a lower alcohol such as methanol or ethanol, a carbonate such as ethylene carbonate, a ketone such as acetone, tetrahydrofuran, N-methyl pyrrolidone or the like. A percentage of water in the mixed solvent is preferably equal to or more than 50 mass %, and more preferably equal to or more than 70 mass %.

When the electrode mixture layer composition is in a coatable slurry form, the content of the medium including water as the percentage of the total composition is in the range of preferably 25 to 90 mass %, and more preferably 35 to 70 mass % from standpoints of slurry coating properties, energy costs required for drying, and productivity. If the electrode mixture layer composition is in the wet powder form that can be pressed, the content of the medium is preferably 3 to 40 mass % and more preferably 10 to 30 mass % from a standpoint of obtaining evenness in the mixture layer after pressing.

The binder of the present teachings may be formed solely of the crosslinked polymer or salt thereof, but this may also be combined with another binder component such as styrene/butadiene latex (SBR), acrylic latex, and polyvinylidene fluoride latex. When another binder component is included, the amount thereof is preferably 0.1 to 5 mass %, more preferably 0.1 to 2 mass %, and yet more preferably 0.1 to 1 mass % of the active material. If the amount of the other binder component exceeds 5 mass %, resistance increases, and the high-rate characteristics may become insufficient.

Further, in a case of thickening the electrode mixture layer from the standpoint of increasing the capacity thereof, the flex resistance of the electrode tends to decrease. From the standpoint of ensuring good flex resistance even in such a case, a latex-based binder having the Tg 10° C. or lower is preferably used together. The Tg of the co-used latex-based binder is more preferably 0° C. or lower. A lower limit value of the Tg is −80° C. due to restriction and the like of a used raw material.

Of the above, styrene/butadiene latex is preferable from the standpoints of balance between the binding ability and the flex resistance and of the excellent flex resistance exhibited even in the case of thickening the electrode mixture layer. This effect of the electrode exhibiting good flex resistance even under the aforementioned thickened layer condition becomes superior with higher hydrophobicity of the substituent in the component (b), and it especially is prominent in a case where the substituent has an aromatic ring.

This styrene/butadiene latex is an aqueous dispersion of a copolymer having a structural unit derived from an aromatic vinyl monomer such as styrene and a structural unit derived from an aliphatic conjugated diene monomer such as 1,3-butadiene.

Examples of the aromatic vinyl monomer include α-methyl styrene, vinyl toluene and divinylbenzene as well as styrene, and one of these or two or more may be used.

The structural unit derived from the aromatic vinyl monomer in the copolymer described above constitutes preferably 20 to 60 mass % and more preferably 30 to 50 mass % of the copolymer primarily from the standpoint of the binding ability.

Examples of the aliphatic conjugated diene monomer include 2-methyl-1,3-butadiene, 2,3-dimethyl-1,3-butadiene, 2-chloro-3-butadiene as well as 1,3-butadiene, and one of these or two or more may be used.

The structural unit derived from the aliphatic conjugated diene monomer constitutes preferably 30 to 70 mass %, and more preferably 40 to 60 mass % of the copolymer from the standpoint of the binding ability of the binder and the flexibility of the resulting electrode.

To further improve binding performance and the like, the styrene/butadiene latex may also use a nitrile (group-containing monomer such as (meth)acrylonitrile or a carboxyl group-containing monomer such as (meth)acrylic acid, itaconic acid or maleic acid as a copolymerized monomer in addition to the monomers described above.

The structural unit derived from the other monomer is contained in the copolymer in the amount of preferably 0 to 30 mass %, and more preferably 0 to 20 mass %.

The electrode mixture layer composition for the nonaqueous electrolyte secondary battery of the present teachings has the active material, water and the binder as essential components, and is obtained by mixing each component by known methods. The methods of mixing the respective components are not particularly limited, and known methods may be used, but in a preferred method the powder components including the active material, conductive assistant and binder (crosslinked polymer particle) are dry blended, and then mixed with a dispersion medium such as water and dispersed and kneaded.

When the electrode mixture layer composition is obtained in the slurry form, it is preferably refined into a slurry without dispersion defects or aggregation. The mixing method may be one using a known mixer such as a planetary mixer, thin film swirling mixer or self-revolving mixer, and a thin film swirling mixer is preferable for obtaining a good dispersed state in a short time. When the thin film swirling mixer is used, pre-dispersion is preferably performed in advance with a disperser or other stirring device.

Further, the viscosity of the slurry is in the range preferably 500 to 100,000 mPa·s, and more preferably 1,000 to 50,000 mPa·s as the B-type viscosity at 60 rpm.

On the other hand, when the electrode mixture layer composition is obtained as the wet powder, it is preferably kneaded with a Henschel mixer, blender, planetary mixer or twin-screw kneader or the like to obtain a uniform state without concentration irregularities.

(Non-Aqueous Electrolyte Secondary Battery Electrode)

The non-aqueous electrolyte secondary battery electrode of the present teachings is provided with the mixture layer formed from the electrode mixture layer composition on the surface of the copper or aluminum collector. The mixture layer is formed by first coating the electrode mixture layer composition of the present teachings on the surface of the collector, and then drying to remove water or other medium. The method of coating the mixture layer composition is not particularly limited, and a known method such as a doctor blade method, dipping, roll coating, comma coating, curtain coating, gravure coating or extrusion may be adopted. Further, the drying may also be accomplished by a known method such as warm air blowing, pressure reduction, (far) infrared exposure or microwave exposure.

The mixture layer obtained after drying is normally subjected to compression treatment with a metal press, roll press or the like. By compressing, the active material and the binder are brought into close contact with each other, and the strength of the mixture layer and the adhesion to the collector can be improved. Preferably compression adjusts a thickness of the mixture layer to about 30% to 80% of its pre-compression thickness, and the thickness of the mixture layer after compression is normally about 4 to 200 μm, however, from the standpoint of ensuring the flex resistance of the electrode, the thickness is generally set in the range of 4 to 60 μm. "Thickening the electrode mixture layer" herein means a case of forming a mixture layer exceeding 60 μm.

A nonaqueous electrolyte secondary battery can be prepared by providing a separator and a nonaqueous electrolyte solution with the nonaqueous electrolyte secondary battery electrode of the present teachings.

The separator is disposed between the positive and negative electrodes of the battery, and serves to prevent short-circuits due to contact between the electrodes, hold the electrolyte solution and ensure ion conductivity. The separator is preferably an insulating finely porous film, having good ion permeability and mechanical strength. Specific materials that can be used include polyolefins such as polyethylene and polypropylene, and polytetrafluoroethylene and the like.

For the nonaqueous electrolyte solution, a known electrolyte solution commonly used in nonaqueous electrolyte secondary batteries can be used. Specific examples of the solvent include cyclic carbonates with high dielectric constants and good ability to dissolve electrolytes, such as propylene carbonate and ethylene carbonate, and linear carbonates with low viscosity, such as ethyl methyl carbonate, dimethyl carbonate and diethyl carbonate, and these may be used alone or as a mixed solvent. A lithium salt such as $LiPF_6$, $LiSbF_6$, $LiBF_4$, $LiClO_4$ or $LiAlO_4$ is dissolved in these solvents and used as the nonaqueous electrolyte solution.

The nonaqueous electrolyte secondary battery can be obtained by winding or laminating the positive plate and negative plate with the separator between the two, and enclosing this in a casing or the like.

EMBODIMENT

The present teachings will be described in detail below based on examples. However, the present teachings are not limited to these examples. In the following, "parts" and "%" mean parts by mass and % by mass respectively, unless otherwise specified.

Manufacturing Example 1

Manufacture of Crosslinked Polymer Salt R-1

A reactor equipped with a stirring blade, a thermometer, a reflux condenser and a nitrogen inlet pipe was used for polymerization.

877 parts of acetonitrile, 3.5 parts of ion exchanged water, 75 parts of acrylic acid (hereunder referred to as "AA"), 25 parts of benzyl acrylate, and 0.5 parts of pentaerythritol triallyl ether (product name "NeoallyIP-30" by Daiso Co., Ltd.) were charged into the reactor.

The inside of the reactor was thoroughly purged with nitrogen, and heated to raise its internal temperature to 55° C. Once the internal temperature was confirmed to have stabilized at 55° C., 0.0625 parts of 2,2'-azobis(2,4-dimethylvaleronitrile) (product name "V-65" by Wako Pure Chemical Industries, Ltd.) were added as the polymerization initiator, and since white turbidity was observed in the reaction solution at this point, this was taken as the polymerization initiation point. The polymerization reaction was continued with the external temperature (water bath temperature) being adjusted to maintain the internal temperature of 55° C., then 0.1 parts of V-65 were added when 6 hours has elapsed since the polymerization initiation point, and the internal temperature was heated to 65° C. The internal temperature was maintained at 65° C., cooling of the reaction solution was initiated when 12 hours had elapsed since the polymerization initiation point, and after when the internal temperature was cooled to 25° C., 39.38 parts of lithium hydroxide-monohydrate (hereinbelow "LiOH•$H_2O$") powder were added slowly so that the internal temperature does not exceed 50° C. After adding the LiOH•$H_2O$ powder, stirring was continued for 12 hours to obtain a slurry-like polymerization reaction solution having particles of the crosslinked polymer salt R-1 (Li salt, neutralization degree of 90 mol %) dispersed in a medium.

The resulting polymer reaction solution was centrifuged to precipitate the polymer particles, and the supernatant was removed. The precipitate was then re-dispersed in acetonitrile having the same weight as the polymer reaction solution, and the operations of precipitating the polymer particles by centrifugation and removing the supernatant were repeated twice. The precipitate was collected and dried for 3 hours at 80° C. under reduced pressure to remove the volatile components and obtain a powder of the crosslinked polymer salt R-1. Because the crosslinked polymer salt R-1 is hygroscopic, it was sealed and stored in a container having water vapor barrier properties. The powder of the crosslinked polymer salt R-1 was IR measured to obtain the neutralization degree from an intensity ratio of a peak derived from C=O group of carboxylic acid and a peak described from C=O group of carboxylic acid Li, and the neutralization degree thereof was 90 mol %, identical to the calculated value from the charged substances.

(Measuring Average Particle Diameter of the Crosslinked Polymer Salt R-1 (Li-Neutralized Product) in 1 mass % NaCl Aqueous Solution)

0.25 g of the crosslinked polymer salt R-1 powder obtained above and 49.75 g of ion exchanged water were measured into a 100 cc container, and set in a rotating/revolving mixer ("Awatori Rentaro AR-250" by Thinky Corporation,). This was then stirred (rotating speed 2.000 rpm/revolving speed 800 rpm, 7 minutes), and then defoamed (rotating speed 2,200 rpm/revolving speed 60 rpm, 1 minute) to prepare a hydrogel of the crosslinked polymer salt R-1 (neutralization degree 90 mol %) swelled with water.

Next, the particle size distribution of this hydrogel was measured with a laser diffraction/scattering type particle size distribution analyzer (Nikkiso Co., Ltd., Microtrac MT-3300EX2) using a 1 mass % NaCl aqueous solution as a dispersion medium. With the dispersion medium circulating in an excess amount relative to the hydrogel, when the hydrogel in an amount sufficient to obtain a suitable scattered light intensity was added and the dispersion medium was added, the measured particle size distribution shape stabilized after a few minutes. Once stability was confirmed, volume-based particle size distribution measurement was performed, and the average particle diameter was found to be 1.3 μm (median diameter (D50)).

A 90 mol % neutralized product of the crosslinked polymer R-1 swells thoroughly in ion-exchange water to form a hydrogel, but in the 1 mass % NaCl aqueous solution the degree of swelling is reduced because the electrostatic repulsion between carboxy anions is blocked, and particle size distribution measurement is possible because dispersion stability in the dispersion medium is maintained by the effect of the carboxylate salt. The smaller the median diameter as measured in the 1 mass % NaCl aqueous solution medium, the more the crosslinked polymer salt is regarded as forming the hydrogel as an aggregation of smaller (more numerous) gel particles even in the ion-exchange water. That is, this means it is broken up into smaller particles in water.

Manufacturing Examples 2 to 10 and 13

Manufacture of Crosslinked Polymer Salts R-2 to R-10 and R-13

The same operations were performed as in Manufacturing Example 1 except that the charged amounts of each starting material were as shown in Table 1, to obtain crosslinked polymer salts R-2 to R-10 and R-13 in powder form. Each crosslinked polymer salt was sealed and stored in a container having water vapor barrier properties.

The average particle diameters of each of the polymer salts were measured in the 1 mass % NaCl aqueous solution as in Manufacturing Example 1. The results are shown in Table 1.

Manufacturing Example 11

Manufacture of Crosslinked Polymer Salt R-11

A reactor equipped with a stirring blade, a thermometer, a reflux condenser and a nitrogen inlet pipe was used for polymerization.

300 parts of methanol, 100 parts of AA, 0.2 parts of allyl methacrylate (hereunder referred to as "AMA", Mitsubishi Gas Chemical Company, Inc.) and 0.5 parts of Neoallyl™ P-30 were charged into the reactor. 32 parts of a LiOH·$H_2O$ powder for initial neutralization and 1.40 parts of ion-exchange water were then slowly added so that the internal temperature was maintained at 40° C. or less under stirring.

The inside of the reactor was thoroughly purged with nitrogen, and heated so that the internal temperature was raised up to 68° C. Once the internal temperature was confirmed to have stabilized at 68° C., 002 parts of 4,4'-azobiscyanovaleric acid (product name "ACVA" by Otsuka Chemical Co., Ltd.) were added as the polymerization initiator, and since white turbidity was observed in the reaction solution at this point, this was taken as the polymerization initiation point. The polymerization reaction was continued with the external temperature (water bath temperature) being adjusted so as to gently reflux the solvent, and solvent reflux was maintained while 0.02 parts of ACVA were added 3 hours after the polymerization initiation point and an additional 0.035 parts of ACVA were added 6 hours after the polymerization initiation point. Cooling of the reaction solution was initiated 9 hours after the polymerization initiation point, the internal temperature was lowered to 30° C., and 20.5 parts of LiOH·H$_2$O powder were then added slowly so that the internal temperature did not exceed 50° C. After the addition of the LiOH·H$_2$O powder, stirring was continued for 3 hours to obtain a slurry-like polymer reaction solution comprising particles of the crosslinked polymer salt R-11 (Li salt, neutralization degree 90 mol %) dispersed in a medium.

The resulting polymer reaction solution was centrifuged to precipitate the polymer particles, and the supernatant was removed. The precipitate was then re-dispersed in acetonitrile having the same weight as the polymer reaction solution, and the operations of precipitating the polymer particles by centrifugation and removing the supernatant were repeated twice. The precipitate was collected and dried for 3 hours at 80° C. under reduced pressure to remove the volatile components and obtain a powder of the crosslinked polymer salt R-11. Because the crosslinked polymer salt R-11 is hygroscopic, it was sealed and stored in a container with water vapor barrier properties. When the powder of the crosslinked polymer salt R-11 was measured by IR and the neutralization degree was determined from the intensity ratio of the peak derived from the C=O group of the carboxylic acid Li and the peak derived from the C=O of the lithium carboxylate, it was equal to the calculated value from charging, which was 90 mol %.

As in Manufacturing Example 1, the average particle diameter of the resulting polymer salt was measured in the 1 mass % NaCl aqueous solution. The results are shown in Table 1.

Manufacturing Example 12

Manufacture of Crosslinked Polymer salt R-12

A powder of the crosslinked polymer salt R-12 was obtained by the same operations as in Manufacturing Example 11 except that the charged amounts of each starting material were as described in Table 1. The crosslinked polymer salt R-12 was sealed and stored in a container having water vapor barrier properties.

As in Manufacturing Example 1, the average particle diameter of the resulting polymer salt was measured in the 1 mass % NaCl aqueous solution. The results are shown in Table 1.

Manufacturing Example 14

Manufacture of Crosslinked Polymer R44

A powder of the (unneutralized) crosslinked polymer R-14 was obtained by the same operations as in Manufacturing Example 1 except that the neutralizer LiOH•H$_2$O was not added. The crosslinked polymer R-14 was sealed and stored in a container having water vapor barrier properties. (Measuring Average Particle Diameter of the Crosslinked Polymer R-14 (Li-Neutralized Product) in 1 Mass % NaCl Aqueous Solution)

0.25 g of the crosslinked polymer R44 powder obtained above and 49.75 g of lithium hydroxide aqueous solution (containing lithium hydroxide equivalent to 90 mol % of the carboxyl groups in the crosslinked polymer R-14) were measured into a 100 cc container, and set in the rotating/revolving mixer ("Awatori Rentaro AR-250" by Thinky Corporation,). This was then stirred (rotating speed 2,000 rpm/revolving speed 800 rpm, 7 minutes), and then defoamed (rotating speed 2,200 rpm/revolving speed 60 rpm, 1 minute) to prepare a hydrogel lithium salt of the crosslinked polymer R-14 (neutralization degree 90 mol %) swelled with water.

Next, the particle size distribution of this hydrogel was measured with the laser diffraction/scattering type particle size distribution analyzer (Nikkiso Co., Ltd., Microtrac MT-3300EX2) using the 1 mass % NaCl aqueous solution as the dispersion medium. With the dispersion medium circulating in an excess amount relative to the hydrogel, when the hydrogel in an amount sufficient to obtain a suitable scattered light intensity was added and the dispersion medium was added, the measured particle size distribution shape stabilized after a few minutes. Once stability was confirmed, volume-based particle size distribution measurement was performed, and the average particle diameter was found to be 1.3 μm (median diameter (D50)).

Manufacturing Examples 15 to 17

Manufacture of Crosslinked Polymers R-15 to R-17

The same operations were performed as in Manufacturing Example 1 except that the charged amounts of each starting material were as shown in Table 2, to obtain crosslinked polymers R-15 to R-17 in powder form. Each crosslinked polymer was sealed and stored in a container having water vapor barrier properties.

After having prepared the Li neutralized product, the average particle diameters of each of the polymers were measured in the 1 mass % NaCl aqueous solution as in Manufacturing Example 14. The results are shown in Table 2.

Aside from the crosslinked polymers (salts) obtained in the Manufacturing Examples 1 to 17 as above, the average particle diameters of marketed polymers were measured in the 1 mass % NaCl aqueous solution. The details are shown below.

Evaluation Example 1

Measuring Average Particle Diameter of Marketed Non-Crosslinked Polymer Na Salt in 1 Mass % NaCl Aqueous Solution The measurement of the average particle diameter of a marketed non-crosslinked polyacrylic acid Na ("Aronvis SX" by Toagosei Co., Ltd., wholly neutralized product, Mw: 1 million or greater) was performed in the 1 mass % NaCl aqueous solution by the same operations as in Manufacturing Example 1, however, the measurement could not be made since a hydrogel cannot be formed with the non-crosslinked polyacrylic acid Na. This is assumed due to not being able to obtain diffraction/scattering light necessary for the measurement.

Evaluation Example 2

Measuring Average Particle Diameter of Marketed Crosslinked Polymer Na Salt in 1 mass % NaCl Aqueous Solution The measurement of the average particle diameter of a marketed crosslinked polyacrylic acid Na ("Rheogic 270" by Toagosei Co., Ltd., wholly neutralized product) was performed in the 1 mass % NaCl aqueous solution by the same operations as in Manufacturing Example 1, and the average particle diameter thereof was 18 μm.

Evaluation Example 3

Measuring Average Particle Diameter of Marketed Crosslinked Polymer in 1 Mass % NaCl Aqueous Solution The measurement of the average particle diameter of a marketed crosslinked polyacrylic acid ("Carbopol 980" by Lubrizol Corporation, unneutralized product) in the 1 mass % NaCl aqueous solution was performed by the same operations as in Manufacturing Example 14, and the average particle diameter thereof was 8.2 μm. The alkali amount used in the lithium neutralization was determined based on the theoretical acid value of polyacrylic acid.

TABLE 1

| | | | Manufacturing Example 1 | Manufacturing Example 2 | Manufacturing Example 3 | Manufacturing Example 4 | Manufacturing Example 5 | Manufacturing Example 6 | Manufacturing Example 7 |
|---|---|---|---|---|---|---|---|---|---|
| Crosslinked Polymer (Salt) | | | R-1 | R-2 | R-3 | R-4 | R-5 | R-6 | R-7 |
| Charged Amount [parts] | Monomer | AA | 75 | 60 | 85 | 75 | 75 | 85 | 85 |
| | | BzA | 25 | 40 | | | | | |
| | | PEA | | | 15 | 25 | | | |
| | | M-5700 | | | | | 25 | | |
| | | M-106 | | | | | | 15 | |
| | | M-110 | | | | | | | 15 |
| | | M-111 | | | | | | | |
| | | CHA | | | | | | | |
| | | SA | | | | | | | |
| | Crosslinking Monomer | AMA | | | | | | | |
| | | P-30 | 0.5 | 0.5 | 0.5 | 0.5 | 1.0 | 0.2 | 0.5 |
| | Initial Neutralization | LiOH·H$_2$O | | | | | | | |
| | Polymerization Solvent | water | 3.50 | 3.50 | 3.50 | 3.50 | 3.50 | 3.50 | 3.50 |
| | | AcN | 877 | 877 | 877 | 877 | 877 | 877 | 877 |
| | | MeOH | | | | | | | |
| | Polymerization Initiator | Initial V-85 | 0.0825 | 0.0625 | 0.0625 | 0.0625 | 0.0525 | 0.0625 | 0.0625 |
| | | Initial ACVA | | | | | | | |
| | | additional V-85 | 0.100 | 0.100 | 0.100 | 0.100 | 0.100 | 0.100 | 0.100 |
| | | additional ACVA | | | | | | | |
| | Process Neutralization | LiON·H$_2$O | 39.38 | 31.50 | 44.83 | 39.38 | 39.38 | 44.63 | 44.63 |
| Initial Monomer Concentration [wt %] | | | 10.2% | 10.2% | 10.2% | 10.2% | 10.2% | 10.2% | 10.2% |
| Crosslinking Agent [mol %]-to-Monomer | | | 0.163% | 0.181% | 0.155% | 0.168% | 0.169% | 0.158% | 0.158% |
| Neutralized Salt | Type | | Li | Na | Na | Li | Li | Li | Li |
| | Neutralization Degree | | 90.0% | 90.0% | 90.0% | 90.0% | 90.0% | 90.0% | 90.0% |
| Average particle diameter in 1 mass % NaCl aqueous solution [μm] | | | 1.3 | 3.1 | 1.4 | 1.2 | 1.4 | 1.2 | 1.2 |

| | | | Manufacturing Example 8 | Manufacturing Example 9 | Manufacturing Example 10 | Manufacturing Example 11 | Manufacturing Example 12 | Manufacturing Example 13 |
|---|---|---|---|---|---|---|---|---|
| Crosslinked Polymer (Salt) | | | R-8 | R-9 | R-10 | R-11 | R-12 | R-13 |
| Charged Amount [parts] | Monomer | AA | 80 | 75 | 90 | 100 | 75 | 100 |
| | | BzA | | | | | | |
| | | PEA | | | | | 25 | |
| | | M-5700 | | | | | | |
| | | M-106 | | | | | | |
| | | M-110 | | | | | | |
| | | M-111 | 10 | | | | | |
| | | CHA | | 25 | | | | |
| | | SA | | | 10 | | | |
| | Crosslinking Monomer | AMA | | | | 0.2 | 0.2 | |
| | | P-30 | 0.5 | 0.5 | 0.5 | 0.5 | 0.5 | 0.5 |
| | Initial Neutralization | LiOH·H$_2$O | | | | 32.00 | 24.00 | |
| | Polymerization Solvent | water | 3.50 | 3.50 | 3.50 | 1.40 | 1.40 | 3.50 |

TABLE 1-continued

|  |  |  |  |  |  |  |  |
|---|---|---|---|---|---|---|---|
|  | Solvent | AcN | 877 | 877 | 877 |  |  | 877 |
|  |  | MeOH |  |  |  | 300 | 300 |  |
|  | Polymerization | Initial V-85 | 0.0625 | 0.0625 | 0.0625 |  |  | 0.0625 |
|  | Initiator | Initial ACVA |  |  |  | 0.020 | 0.020 |  |
|  |  | additional V-85 | 0.100 | 0.100 | 0.100 |  |  | 0.100 |
|  |  | additional ACVA |  |  |  | 0.055 | 0.055 |  |
|  | Process Neutralization | LiON•H$_2$O | 47.25 | 39.38 | 47.25 | 20.50 | 15.38 | 52.50 |
| Initial Monomer Concentration [wt %] |  |  | 10.2% | 10.2% | 10.2% | 23.0% | 23.5% | 10.2% |
| Crosslinking Agent [mol %]-to-Monomer |  |  | 0.152% | 0.162% | 0.152% | 0.255% | 0.302% | 0.140% |
| Neutralized Salt | Type |  | Li | Li | Li | Li | Li | Li |
|  | Neutralization Degree |  | 90.0% | 90.0% | 90.0% | 90.0% | 90.0% | 90.0% |
| Average particle diameter in 1 mass % NaCl aqueous solution [μm] |  |  | 1.1 | 1.3 | 1.3 | 18.0 | 24.0 | 1.8 |

TABLE 2

|  |  |  | Manufacturing Example 14 | Manufacturing Example 15 | Manufacturing Example 16 | Manufacturing Example 17 | Evaluation Example 1 | Evaluation Example 2 | Evaluation Example 3 |
|---|---|---|---|---|---|---|---|---|---|
| Crosslinked Polymer (Salt) |  |  | R-14 | R-15 | R-16 | R-17 | Aronvis SX | Rheogic 270 | Carbopol 980 |
| Charged Amount [parts] | Monomer | AA | 75 | 85 | 75 | 100 |  |  |  |
|  |  | BzA | 25 |  |  |  |  |  |  |
|  |  | PEA |  | 15 | 25 |  |  |  |  |
|  |  | M-5700 |  |  |  |  |  |  |  |
|  |  | M-106 |  |  |  |  |  |  |  |
|  |  | M-110 |  |  |  |  |  |  |  |
|  |  | M-111 |  |  |  |  |  |  |  |
|  |  | CHA |  |  |  |  |  |  |  |
|  |  | SA |  |  |  |  |  |  |  |
|  | Crosslinking Monomer | AMA |  |  |  |  |  |  |  |
|  |  | P-30 | 0.5 | 0.5 | 0.5 | 0.5 |  |  |  |
|  | Initial Neutralization | LiOH•H$_2$O |  |  |  |  |  |  |  |
|  | Polymerization Solvent | water | 3.50 | 3.50 | 3.50 | 3.50 |  |  |  |
|  |  | AcN | 877 | 877 | 877 | 877 |  |  |  |
|  |  | MeOH |  |  |  |  |  |  |  |
|  | Polymerization Initiator | Initial V-65 | 0.0625 | 0.0625 | 0.0625 | 0.0625 |  |  |  |
|  |  | Initial ACVA |  |  |  |  |  |  |  |
|  |  | additional V-65 | 0.100 | 0.100 | 0.100 | 0.100 |  |  |  |
|  |  | additional ACVA |  |  |  |  |  |  |  |
|  | Process Neutralization | LiON•H$_2$O |  |  |  |  |  |  |  |
| Initial Monomer Concentration [wt %] |  |  | 10.2% | 10.2% | 10.2% | 10.2% |  |  |  |
| Crosslinking Agent [mol %]-to-Monomer |  |  | 0.163% | 0.155% | 0.166% | 0.140% |  |  |  |
| Neutralized Salt | Type |  | Unneutralized | Unneutralized | Unneutralized | Unneutralized | Na | Na | Unneutralized |
|  | Neutralization Degree |  |  |  |  |  | 100% | 100% |  |
| Average particle diameter in 1 mass % NaCl aqueous solution [μm] |  |  | 1.3 | 1.4 | 1.2 | 1.8 | Not measurable | 18 | 8.2 |

The details of the compounds used in Table 1 or 2 are given below.

AA: Acrylic acid

BzA: Benzyl acrylate (Osaka Organic Chemical Industry Ltd., Viscoat #160)

PEA: Phenoxy ethyl acrylate (Osaka Organic Chemical Industry Ltd., Viscoat #192)

M-5700: 2-hydroxy-3-phenoxypropyl acrylate (Toagosei Co., Ltd., Aronix M-5700)

M-106: o-phenyl phenoxy ethyl acrylate (Toagosei Ltd., Aronix M-106)

M-110: Paracumyl phenoxy ethyl acrylate (Toagosei Co., Ltd., Aronix M-110)

M-111: Nonyl phenoxy ethyl acrylate (Toagosei Co., Ltd., Aronix M-110)

CHA: Cyclohexyl acrylate

SA: Stearyl acrylate

AMA: Allyl methacrylate

P-30: Pentaerythritol triallyl ether (Daiso Co., Ltd. Neoallyl™ P-30)

AcN: Acetonitrile

MeOH: Methanol

V-65; 2,2'-azobis(2,4-dimethylvaleronitrile) (Wako Pure Chemical Industries, Ltd.)

ACVA: 4,4'-azobiscyanovaleric acid (Otsuka Chemical Co., Ltd.)

(Electrode Evaluation Using Carbon-Based Active Material as Active Material for Negative Electrode)

Example 1-1

The coating properties of a mixture layer composition using graphite as the negative electrode active material and the crosslinked polymer salt R-1 as the binder were measured, and the peel strength between the formed mixture layer and the collector (that is, the binding ability of the binder) was evaluated.

100 parts of natural graphite (product name "CGB-10" by Nippon Graphite Industries) and 2.2 parts of the crosslinked polymer salt R-1 in the powder form were weighed and thoroughly premixed, and 125 parts of ion-exchange water was added and pre-dispersed with a disperser, after which main dispersion was performed for 15 seconds at a peripheral speed of 20 m/second with a thin film swirling mixer (Primix Corporation, FM-56-30) to obtain a slurry-like negative electrode mixture layer composition.

This mixture layer composition was coated with an adjustable applicator on a 20 μm-thick copper foil (Nippon Foil Mfg. Co., Ltd.) so that the dried and pressed film thickness was 50 μm, and then immediately dried for 10 minutes at 100° C. in a ventilating dryer to form a mixture layer. The external appearance of the resulting mixture layer was observed with the naked eye, and the coating properties were evaluated according to the following standard and judged as good ("A").

(Coating Property Evaluation Standard)

A: No streaks, spots or other appearance defects observed on surface

B: Slight streaks, spots or other appearance defects observed on surface

C: Obvious streaks, spots or other appearance defects observed on surface (90° Peel Strength (Binding Ability))

The mixture layer density was adjusted with a roll press to 1.7±0.05 g/cm3 to prepare an electrode, which was then cut into a 25 mm-wide strip to prepare a sample for peel testing. The mixture layer side of this sample was affixed to a horizontally fixed double-sided tape and peeled at 90° at a rate of 50 mm/minute, and the peel strength between the mixture layer and the copper foil was measured. The peel strength was high at 18.8 N/m, exhibiting a favorable strength.

In general, when an electrode is cut, worked and assembled into a battery cell, greater peel strength is necessary to prevent the problem of detachment of the mixture layer from the collector (copper foil). The high peel strength in this case means that the binder provides excellent binding ability between the active materials and between the active material and the electrode, and suggests that it is possible to obtain a battery with excellent durability and little loss of capacity during charge-discharge cycle testing.

(Flex Resistance)

This was evaluated using the electrode sample similar to that used in the 90° peel strength test. The electrode sample was wrapped around a SUS 2.0 mm in diameter, the condition of the bent mixture layer was observed, and flex resistance was evaluated based on the following standard, resulting in an evaluation of "A".

A: No appearance defects observed in mixture layer

B: Fine cracks observed in mixture layer

C: Obvious cracks observed in the mixture layer, or the mixture layer partially detached A case where no abnormality can be observed on the outer appearance in this evaluation means that the risk of a defective product generation caused by breakage and cracks in the electrode mixture layer and detachment thereof upon winding the electrode and subjecting it to processing during the electrode manufacture is small.

Examples 1-2 to 1-10 and Comparative Examples 1-1 to 1-5

Mixture layer compositions were prepared by the same operations as in Example 1-1 except that the crosslinked polymers salt used as the binder were as shown in Table 3 or 4, and the coating properties, 90° peel strength and flex resistance were evaluated. The results are shown in Table 3 or 4.

TABLE 3

|  |  | Example 1-1 | Example 1-2 | Example 1-3 | Example 1-4 | Example 1-5 | Example 1-6 | Example 1-7 | Example 1-8 | Example 1-9 | Example 1-10 |
| --- | --- | --- | --- | --- | --- | --- | --- | --- | --- | --- | --- |
| Active Material | Graphite | 100 | 100 | 100 | 100 | 100 | 100 | 100 | 100 | 100 | 100 |
| Crosslinked Polymer | Type | R-1 | R-2 | R-3 | R-4 | R-5 | R-6 | R-7 | R-8 | R-9 | R-10 |
|  | Parts | 2.2 | 2.2 | 2.2 | 2.2 | 2.2 | 2.2 | 2.2 | 2.2 | 2.2 | 2.2 |
| ion exchange water |  | 125 | 125 | 125 | 125 | 125 | 125 | 125 | 125 | 125 | 125 |
| Mixture Layer Slurry Concentration |  | 45.0% | 45.0% | 45.0% | 45.0% | 45.0% | 45.0% | 45.0% | 45.0% | 45.0% | 45.0% |
| Coating Properties |  | A | B | A | A | A | A | A | A | A | A |
| Peel Strength N/m |  | 18.8 | 15.1 | 19.6 | 22.4 | 24.0 | 22.0 | 21.2 | 20.4 | 16.4 | 17.2 |
| Flex Resistance |  | A | A | A | A | A | A | A | A | A | A |

TABLE 4

|  |  | Comparative Example 1-1 | Comparative Example 1-2 | Comparative Example 1-3 | Comparative Example 1-4 | Comparative Example 1-5 |
| --- | --- | --- | --- | --- | --- | --- |
| Active Material | Graphite | 100 | 100 | 100 | 100 | 100 |
| Crosslinked Polymer | Type | R-11 | R-12 | R-13 | Aronvis SX | Rheogic 270 |
|  | Parts | 2.2 | 2.2 | 2.2 | 2.2 | 2.2 |

TABLE 4-continued

|  | Comparative Example 1-1 | Comparative Example 1-2 | Comparative Example 1-3 | Comparative Example 1-4 | Comparative Example 1-5 |
|---|---|---|---|---|---|
| ion exchange water | 125 | 125 | 125 | 125 | 125 |
| Mixture Layer Slurry Concentration | 45.0% | 45.0% | 45.0% | 45.0% | 45.0% |
| Coating Properties | B | C | A | C | B |
| Peel Strength N/m | 1.2 | 2.0 | 12.8 | 3.6 | 4.8 |
| Flex Resistance | C | C | B | C | C |

Example 2-1

The coating properties of a mixture layer composition under thickened condition using graphite as the negative electrode active material and the crosslinked polymer salt R-1 as the binder were measured, and the peel strength between the formed mixture layer and the collector (that is, the binding ability of the binder) was evaluated.

100 parts of natural graphite (product name "CGB-10" by Nippon Graphite Industries) and 2.2 parts of the crosslinked polymer salt R-1 in powder form were weighed and thoroughly premixed, and 125 parts of ion-exchange water was added and pre-dispersed with the disperser, after which the main dispersion was performed for 15 seconds at the peripheral speed of 20 m/second with the thin film swirling mixer (Primix Corporation, FM-56-30) to obtain a slurry-like negative electrode mixture layer composition.

This mixture layer composition was coated with an adjustable applicator on the 20 μm-thick copper foil (Nippon Foil Mfg. Co., Ltd.) so that the dried and pressed film thickness was 80 μm, and then immediately dried for 15 minutes at 100° C. in the ventilating dryer to form a mixture layer. The external appearance of the resulting mixture layer was observed with the naked eye, and the coating properties were evaluated according to the same standard as Example 1-1 and judged as good ("A").

Further, the 90° peeling strength and the flex resistance were evaluated by the same method as Example 1-1. The result is shown in Table 5.

Examples 2-3, 2-5 and Comparative Examples 2-1, 2-3, 2-5

Mixture layer compositions were prepared by the same operations as in Example 2-1 except that the crosslinked polymer salts used as the binder were as shown in Table 5 or 6, and the coating properties, 90° peel strength and flex resistance were evaluated. The results are shown in Table 5 or 6.

Example 2-2

100 parts of natural graphite (product name "CGB-10" by Nippon Graphite Industries) and 1.2 parts of the crosslinked polymer Li salt R-1 in powder form were weighed and thoroughly premixed, and 100 parts of ion-exchange water was added and pre-dispersed with the disperser. After this, 2.06 parts of styrene/butadiene latex (SBR) (1.0 parts in solid content) was added and the main dispersion was performed for 15 seconds at the peripheral speed of 20 m/second with the thin film swirling mixer (Primix Corporation, FM-56-30) to obtain a slurry-like negative electrode mixture layer composition, "TRD2001" (active ingredient 48.5%, pH 7.8) by JSR Corporation was used as the SBR.

The obtained negative electrode mixture layer composition was evaluated for its coating properties, 90° peeling strength, and flex resistance by the same method as Example 2-1. The result is shown in Table 5.

Examples 2-4, 2-6 and Comparative Examples 2-2, 2-4, 2-6

Mixture layer compositions were prepared by the same operations as in Example 2-2 except that the crosslinked polymer salts used as the binder were as shown in Table 5 or 6, and the coating properties, 90° peel strength and flex resistance were evaluated. The results are shown in Table 5 or 6.

TABLE 5

|  |  | Example 2-1 | Example 2-2 | Example 2-3 | Example 2-4 | Example 2-5 | Example 2-6 |
|---|---|---|---|---|---|---|---|
| Active Meterial | Graphite | 100 | 100 | 100 | 100 | 100 | 100 |
| Crosslinked Polymer | Type | R-1 | R-1 | R-3 | R-3 | R-4 | R-4 |
|  | Parts | 2.2 | 1.2 | 2.2 | 1.2 | 2.2 | 1.2 |
| SBR | Solid Content |  | 1.0 |  | 1.0 |  | 1.0 |
|  | Appearance |  | 2.06 |  | 2.06 |  | 2.06 |
| ion exchange water |  | 125 | 100 | 125 | 100 | 125 | 100 |
| Mixture Layer Slurry Concentration |  | 45.0% | 50.3% | 45.0% | 50.3% | 45.0% | 50.3% |
| Coating Properties |  | A | A | A | A | A | A |
| Peel Strength N/m |  | 16.1 | 21.4 | 17.3 | 23.8 | 20.9 | 29.7 |
| Flex Resistance |  | B | A | B | A | B | A |

TABLE 6

|  |  | Comparative Example 2-1 | Comparative Example 2-2 | Comparative Example 2-3 | Comparative Example 2-4 | Comparative Example 2-5 | Comparative Example 2-6 |
|---|---|---|---|---|---|---|---|
| Active Material | Graphite | 100 | 100 | 100 | 100 | 100 | 100 |
| Crosslinked Polymer | Type | R-12 | R-12 | R-13 | R-13 | Rheojgic 270 | Rheojgic 270 |
|  | Parts | 2.2 | 1.2 | 2.2 | 1.2 | 2.2 | 1.2 |
| SBR | Solid Content |  | 1.0 |  | 1.0 |  | 1.0 |
|  | Appearance |  | 2.06 |  | 2.06 |  | 2.06 |
| ion exchange water |  | 125 | 100 | 125 | 100 | 125 | 100 |
| Mixture Layer Slurry Concentration |  | 45.0% | 50.3% | 45.0% | 50.3% | 45.0% | 50.3% |
| Coating Properties |  | B | C | A | A | B | A |
| Peel Strength N/m |  | 1.0 | 1.7 | 12.0 | 10.8 | 4.0 | 3.2 |
| Flex Resistance |  | B | C | B | A | C | C |

(Electrode Evaluation Using Carbon-Based Active Material and Silicon-Based Active Material as Active Materials for Negative Electrode)

Example 3-1

The coating properties of a mixture layer composition using silicon particles and graphite as the negative electrode active materials and the crosslinked polymer salt R-1 as the binder were measured, and the peel strength between the formed mixture layer and the collector (that is, the binding ability of the binder) was evaluated.

20 parts of silicon particles (Sigma-Aldrich. Corporation, Si Nanopowder, particle diameter <100 nm) and 80 parts of natural graphite (product name "CGB-10" by Nippon Graphite Industries) were stirred for 1 hour at 300 rpm with a planetary ball mill (Fritsch GmbH, P-5). 2.2 parts of the crosslinked polymer salt R-1 in the powder form were weighed into the resulting mixture and thoroughly pre-mixed, 110 parts of ion-exchange water were added and the mixture was pre-dispersed with the disperser, after which the main dispersion was performed for 15 seconds at the peripheral speed of 20 m/second with the thin film swirling mixer (Primix Corporation, FM-56-30) to Obtain a slurry-like negative electrode mixture layer composition.

This mixture layer composition was coated with an adjustable applicator on the 20 μm-thick copper foil. (Nippon Foil Mfg. Co., Ltd.) so that the dried and pressed film thickness was 80 nm, and then immediately dried for 15 minutes at 100° C. in the ventilating dryer to form a mixture layer. The external appearance of the resulting mixture layer was observed with the naked eye, and the coating properties were evaluated according to the same standard as Example 1-1 and judged as good ("A").

Further, the 90° peeling strength and the flex resistance were evaluated by the same method as Example 1-1. The result is shown in Table 7. The mixture layer concentration was prepared at 1.75±0.05 g/cm³.

Examples 3-3, 3-5

Mixture layer compositions were prepared by the same operations as in Example 3-1 except that the crosslinked polymer salts used as the binder were as shown in Table 7, and the coating properties, 90° peel strength and flex resistance were evaluated. The results are shown in Table 7.

Example 3-2

20 parts of silicon particles (Sigma-Aldrich Corporation, Si Nanopowder, particle diameter <100 nm) and 80 parts of natural graphite (product name "CGB-10" by Nippon Graphite Industries) were stirred for 1 hour at 300 rpm with the planetary ball mill (Fritsch GmbH, P-5). 1.2 parts of the crosslinked polymer Li salt R-1 in the powder form were weighed into the resulting mixture and thoroughly pre-mixed, 100 parts of ion-exchange water were added, and the mixture was pre-dispersed with the disperser. After this, 2.06 parts of TRD2001 (SBR) (1.0 parts in solid content) was added and the main dispersion was performed for 15 seconds at the peripheral speed of 20 m/second with the thin film swirling mixer (Primix Corporation, FM-56-30) to obtain a slurry-like negative electrode mixture layer composition.

The obtained negative electrode mixture layer composition was evaluated for its coating properties, 9° peeling strength, and Hex resistance by the same method as Example 3-1, The result is shown in Table 7.

Examples 3-4, 3-6

Mixture layer compositions were prepared by the same operations as in Example 3-2 except that the crosslinked polymer salts used as the binder were as shown in Table 7, and the coating properties, 90° peel strength and flex resistance were evaluated. The results are shown in Table 7.

TABLE 7

|  |  | Example 3-1 | Example 3-2 | Example 3-3 | Example 3-4 | Example 3-5 | Example 3-6 |
|---|---|---|---|---|---|---|---|
| Active Material | Graphite | 80 | 80 | 80 | 80 | 80 | 80 |
|  | Si particles | 20 | 20 | 20 | 20 | 20 | 20 |
| Crosslinked Polymer | Type | R-1 | R-1 | R-3 | R-3 | R-4 | R-4 |
|  | Parts | 2.2 | 1.2 | 2.2 | 1.2 | 2.2 | 1.2 |
| SBR | Solid Content |  | 1.0 |  | 1.0 |  | 1.0 |
|  | Appearance |  | 2.06 |  | 2.06 |  | 2.06 |
| ion exchange water |  | 125 | 100 | 125 | 100 | 125 | 100 |

TABLE 7-continued

|  | Example 3-1 | Example 3-2 | Example 3-3 | Example 3-4 | Example 3-5 | Example 3-6 |
|---|---|---|---|---|---|---|
| Mixture Layer Slurry Concentration | 45.0% | 50.3% | 45.0% | 50.3% | 45.0% | 50.3% |
| Coating Properties | A | A | A | A | A | A |
| Peel Strength N/m | 29.8 | 37.2 | 36.3 | 46.5 | 41.8 | 50.6 |
| Flex Resistance | B | A | B | A | B | A |

(Evaluation of Positive Electrode)

Example 4-1

The coating properties of a mixture layer composition using lithium nickel cobalt manganese oxide (NCM) as the positive electrode active material, acetylene black (AB) as the conductive assistant and the crosslinked polymer R-14 as the binder were measured, and the peel strength between the formed mixture layer and the collector (that is, the binding ability of the binder) was evaluated.

93 parts of NCM111 (Toda Kogyo Corp., NM-3050), 7 parts of AB (Denki Kagaku HS-100) and 1.5 parts of the crosslinked polymer R-14 in powder formed were weighed and thoroughly premixed, 110 parts of ion-exchange water were added, and the mixture was pre-dispersed with the disperser, after which the main dispersion was performed for 15 seconds at the peripheral speed of 20 in/second with time thin film swirling mixer (Primix Corporation, FM-56-30) to obtain a slurry-like positive electrode mixture layer composition. Because lithium ions are eluted (alkalized, exchanged for protons in water) from the NCM in the positive electrode mixture layer composition, some (or all) of the carboxyl groups of the crosslinked polymer R-14 are neutralized and converted to lithium salts. This positive electrode mixture layer composition had a pH of 8.9.

This mixture layer composition was coated with the adjustable applicator on the 15 μm-thick aluminum foil (Nippon Foil Mfg. Co., Ltd.) so that the dried and pressed film thickness was 50 μm, and then immediately dried for 10 minutes at 100° C. in the ventilating, dryer to form a mixture layer. The external appearance of the resulting mixture layer was observed with the naked eye, and the coating properties were evaluated according to the following standard and judged as good ("A").

(Coating Property Evaluation Standard)

A: No streaks, spots or other appearance defects observed on surface

B: Slight streaks, spots or other appearance defects observed on surface

C: Obvious streaks, spots or other appearance defects observed on surface (90° Peel Strength (Binding Ability))

The mixture layer density was adjusted with the roll press to 2.7±0.1 g/cm³ to prepare an electrode, which was then cut into a 25 mm-wide strip to prepare a sample for the peel testing. The mixture layer side of this sample was affixed to a horizontally fixed double-sided tapes and peeled at 90° at the rate of 50 mm/minute, and the peel strength between the mixture layer and the copper foil was measured. The peel strength was high at 15.1 N/m, exhibiting a favorable strength.

(Flex Resistance)

Flex resistance was evaluated using the electrode sample similar to that used in the 90° peel strength test. The electrode sample was wrapped around the SUS rod 2.0 mm in diameter, the condition of the bent mixture layer was observed, and flex resistance was evaluated based on the following standard, resulting in an evaluation of "A".

A: No appearance defects observed in mixture layer

B: Fine cracks observed in mixture layer

C: Obvious cracks observed in mixture layer, or mixture layer partially detached Examples 4-2, 4-3, Comparative Examples 4-1, 4-2

Mixture layer compositions were prepared by the same operations as in Example 4-1 except that the crosslinked polymer salts used as the binder were as shown in Table 8, and the coating properties, 90° peel strength and flex resistance were evaluated. The results are shown in Table 8.

TABLE 8

|  |  | Example 4-1 | Example 4-2 | Example 4-3 | Comparative Example 4-1 | Comparative Example 4-2 |
|---|---|---|---|---|---|---|
| NCM |  | 93 | 93 | 93 | 93 | 93 |
| Acetylene black |  | 7 | 7 | 7 | 7 | 7 |
| Crosslinked Polymer | Type | R-14 | R-15 | R-16 | R-17 | Carbopol 980 |
|  | Parts | 1.5 | 1.5 | 1.5 | 1.5 | 1.5 |
| ion exchange water |  | 110 | 110 | 110 | 110 | 110 |
| Mixture Layer Slurry Concentration |  | 48.0% | 48.0% | 48.0% | 48.0% | 48.0% |
| Coating Properties |  | A | A | A | B | C |
| Peel Strength N/m |  | 15.1 | 19.3 | 22.2 | 8.9 | 4.2 |
| Flex Resistance |  | A | A | A | B | C |

Examples as above involve electrode mixture layer compositions containing binders for nonaqueous electrolyte secondary battery electrodes of the present teachings and electrodes prepared using these. The coating properties of each mixture layer composition (slurry) were good, and the peel strength between the mixture layer and the collector of the resulting electrode was high in all cases, indicating excellent binding ability. Further, the flex resistance of the electrodes was also confirmed to be at a satisfying level.

From the results shown in Table 5 (Examples 2-1 to 2-6) and Table 7 (Examples 3-1 to 3-6), the results indicating that both the binding ability (peeling strength) and the flex resistance can highly be stablished when the hinder using the crosslinked polymer (salt) of the present teachings and SBR. This effect was shown more prominently in the case of using the silicon-based active material (Examples 3-1 to 3-6). This is thought to be effective in the use of the silicon-based active material or thickening of the mixture layer aiming to increase the capacity of the battery.

On the other hand, with the crosslinked polymers (salts) R-11 and 12 and the marketed polymers, the particle size is large in the 1 mass % NaCl aqueous solution, and there appear to be many secondary aggregates of polymer particles in the mixture layer composition thereof. When such a crosslinked polymer (salt) was used as the binder, the peel strength of the mixture layer was low, and the flex resistance of the electrode was also inadequate (Comparative Examples 1-1, 1-2, 1-4, 1-5). Similarly, satisfactory effects were not obtained in terms of binding ability when using R-13 in which the crosslinked polymer (salt) does not have the substituent having the carbon atom number of 6 or more (Comparative Examples 2-3, 2-4).

INDUSTRIAL APPLICABILITY

Because the binder for a nonaqueous electrolyte secondary battery electrode of the present teaching exhibits excellent binding ability in the mixture layer, the nonaqueous electrolyte secondary battery provided with the electrode obtained using this binder is expected to have good durability (cycle characteristics) even after repeated high-rate charge and discharge, and should be applicable to vehicle-mounted secondary batteries. Further, it is also effective in the use of the active material containing silicon or in thickening the electrode mixture layer, and its contribution to the battery capacity increase can be expected.

Moreover, the binder of the present teachings can also impart good flex resistance to the electrode mixture layer. Consequently, it can help to reduce troubles and increase yield during electrode manufacture.

The invention claimed is:

1. A binder comprising a crosslinked polymer having a carboxyl group, or salt thereof, wherein
the crosslinked polymer comprises a structural unit derived from an ethylenically unsaturated carboxylic acid monomer in an amount of 50 to 99 mass % of total structural units and a structural unit derived from a nonionic ethylenically unsaturated monomer in an amount of 1 to 50 mass % of the total structural units,
the nonionic ethylenically unsaturated monomer is a compound having a substituent with a carbon atom number of 6 or more, and
wherein the crosslinked polymer is structured such that when a hydrogel of a neutralized form of the crosslinked polymer is circulated in a NaCl dispersion medium, the neutralized form of the crosslinked polymer has a volume-based median diameter of 0.1 to 7.0 μm, the volume-based median diameter being measured by analyzing the circulated medium via a laser diffraction/scattering particle size distribution measuring method, where the circulated medium contains a 1 mass % NaCl aqueous solution as a dispersion medium and an effective amount of the hydrogel of the neutralized form of the crosslinked polymer to obtain an operative scattered light intensity, wherein
the neutralized form of the crosslinked polymer is neutralized to a degree of neutralization of 80 to 100 mol %, and the hydrogel contains 0.5 mass % of the 80 to 100 mol % neutralized form of the crosslinked polymer.

2. The binder according to claim 1, wherein
the crosslinked polymer is crosslinked with a crosslinking monomer, and
an amount of the crosslinking monomer used is 0.02 to 0.7 mol % of a total amount of the non-crosslinking monomers.

3. The binder according to claim 1, wherein the substituent with the carbon atom number of 6 or more in the nonionic ethylenically unsaturated monomer has an aromatic ring.

4. A method for manufacturing a crosslinked polymer or a salt thereof having a carboxyl group for use as a binder,
wherein the crosslinked polymer is structured such that when a hydrogel of a neutralized form of the crosslinked polymer is circulated in a NaCl dispersion medium, the neutralized form of the crosslinked polymer has a volume-based median diameter of 0.1 to 7.0 μm, the volume-based median diameter being measured by analyzing the circulated medium via a laser diffraction/scattering particle size distribution measuring method, where the circulated medium contains a 1 mass % NaCl aqueous solution as a dispersion medium and an effective amount of the hydrogel of the neutralized form of the crosslinked polymer to obtain an operative scattered light intensity, wherein
the neutralized form of the crosslinked polymer is neutralized to a degree of neutralization of 80 to 100 mol %, and
the hydrogel contains 0.5 mass % of the 80 to 100 mol % neutralized form of the crosslinked polymer,
the method comprising polymerizing a monomer composition by precipitating polymerization, the monomer composition having ethylenically unsaturated carboxylic acid monomers in an amount of 50 to 99 mass % and nonionic ethylenically unsaturated monomers having a substituent with a carbon atom number of 6 or more in an amount of 1 to 50 mass %.

5. The method for manufacturing the crosslinked polymer or the salt thereof according to claim 4, wherein a polymerization medium containing acetonitrile is used in the polymerizing.

6. The method for manufacturing the crosslinked polymer or the salt thereof according to claim 4, further comprising:
drying which takes place after the polymerizing; and
neutralizing which takes place after the polymerizing and before the drying, and in which the polymer is neutralized by adding an alkali compound to a polymer dispersion obtained in the polymerizing.

7. A nonaqueous electrolyte secondary battery electrode mixture layer composition comprising a binder according to claim 1, an active material, and water.

8. The nonaqueous electrolyte secondary battery electrode mixture layer composition according to claim 7, further comprising a styrene/butadiene latex as a binder.

9. The nonaqueous electrolyte secondary battery electrode mixture layer composition according to claim 7, further comprising a carbon material or a silicon material as a negative electrode active material.

10. The nonaqueous electrolyte secondary battery electrode mixture layer composition according to claim 7, further comprising a lithium-containing metal oxide as a positive electrode active material.

11. A nonaqueous electrolyte secondary battery electrode comprising a mixture layer constituted on a collector surface, the mixture layer being constituted of a nonaqueous electrolyte secondary battery electrode mixture layer composition according to claim 7.

* * * * *